(12) United States Patent
Atkins

(10) Patent No.: US 8,808,096 B2
(45) Date of Patent: Aug. 19, 2014

(54) FLYWHEEL

(75) Inventor: Andrew Atkins, West Sussex (GB)

(73) Assignee: Ricardo UK Limited (GB)

( * ) Notice: Subject to any disclaimer, the term of this patent is extended or adjusted under 35 U.S.C. 154(b) by 0 days.

(21) Appl. No.: 13/260,666

(22) PCT Filed: Mar. 26, 2010

(86) PCT No.: PCT/GB2010/000590
§ 371 (c)(1),
(2), (4) Date: Feb. 8, 2012

(87) PCT Pub. No.: WO2010/109208
PCT Pub. Date: Sep. 30, 2010

(65) Prior Publication Data
US 2012/0190461 A1    Jul. 26, 2012

(30) Foreign Application Priority Data

Mar. 27, 2009 (GB) .................................. 0905344.8

(51) Int. Cl.
*F16D 27/00* (2006.01)

(52) U.S. Cl.
USPC .......................................................... 464/29

(58) Field of Classification Search
USPC ..................................... 464/29; 310/103, 104
See application file for complete search history.

(56) References Cited

U.S. PATENT DOCUMENTS

| | | | |
|---|---|---|---|
| 4,115,040 A * | 9/1978 | Knorr | .......................... 464/29 X |
| 4,123,949 A | 11/1978 | Knight, Jr. et al. | |
| 4,183,259 A | 1/1980 | Giovachini et al. | |
| 4,277,707 A * | 7/1981 | Silver et al. | .................... 310/104 |
| 4,359,912 A | 11/1982 | Small | |
| 4,588,040 A | 5/1986 | Albright, Jr. et al. | |
| 4,625,135 A | 11/1986 | Kasabian | |
| 4,660,435 A | 4/1987 | Davis et al. | |
| 4,767,378 A | 8/1988 | Obermann | |
| 4,896,064 A | 1/1990 | Taiani | |
| 5,165,305 A | 11/1992 | Veronesi | |
| 5,214,358 A | 5/1993 | Marshall | |
| 5,341,060 A | 8/1994 | Kawamura | |
| 5,466,049 A | 11/1995 | Harmsen | |
| 5,514,923 A | 5/1996 | Gossler et al. | |
| 5,569,111 A | 10/1996 | Cho et al. | |

(Continued)

FOREIGN PATENT DOCUMENTS

| | | |
|---|---|---|
| CN | 1551462 A | 12/2004 |
| CN | 101051773 A | 10/2007 |

(Continued)

OTHER PUBLICATIONS

International Search Report from PCT/GB2010/000590 dated Aug. 3, 2010 (3 pages).

(Continued)

*Primary Examiner* — Gregory Binda
(74) *Attorney, Agent, or Firm* — Lerner, David, Littenberg, Krumholz & Mentlik, LLP

(57) ABSTRACT

An apparatus and method for transmitting torque from a flywheel inside a vacuum chamber to a driveshaft outside the vacuum chamber includes constructing a magnetic gear coupling using a pair of permanent magnet arrays having magnetic flux coupling elements arranged in the vacuum chamber wall therebetween so as to effectively couple magnetic flux between the arrays.

16 Claims, 25 Drawing Sheets

(56) References Cited

U.S. PATENT DOCUMENTS

Figure 1:
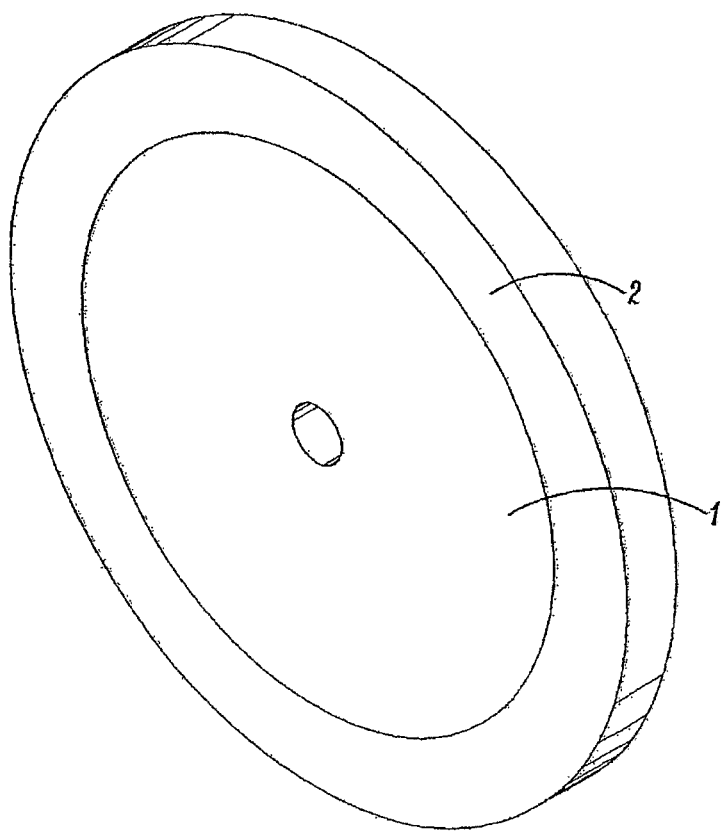

| | | | |
|---|---|---|---|
| 5,633,555 A | 5/1997 | Ackermann et al. | |
| 5,763,973 A * | 6/1998 | Cramer | 310/103 |
| 5,784,926 A | 7/1998 | Maass | |
| 6,440,055 B1 | 8/2002 | Meisberger | |
| 6,441,581 B1 | 8/2002 | King et al. | |
| 6,604,360 B1 | 8/2003 | Vuk | |
| 7,416,039 B1 | 8/2008 | Anderson et al. | |
| 7,508,104 B2 | 3/2009 | Schmidt et al. | |
| 8,183,722 B2 | 5/2012 | Akutsu et al. | |
| 2002/0006523 A1 | 1/2002 | Obeshaw | |
| 2005/0028628 A1 | 2/2005 | Liue | |
| 2005/0161304 A1 | 7/2005 | Brandl et al. | |
| 2007/0101714 A1 | 5/2007 | Duesmann et al. | |
| 2008/0207336 A1 | 8/2008 | Yokoyama | |
| 2010/0259121 A1 | 10/2010 | Ueda et al. | |
| 2011/0037333 A1 | 2/2011 | Atallah et al. | |
| 2011/0057456 A1* | 3/2011 | Atallah et al. | 310/104 X |
| 2012/0111689 A1* | 5/2012 | Atkins et al. | |

FOREIGN PATENT DOCUMENTS

| | | |
|---|---|---|
| CN | 101127465 A | 2/2008 |
| DE | 955524 C | 1/1957 |
| DE | 2119015 A1 | 10/1972 |
| DE | 2535790 A1 | 3/1976 |
| DE | 2622295 A1 | 12/1977 |
| DE | 2634918 A1 | 2/1978 |
| DE | 3143845 A1 | 5/1983 |
| DE | 3137197 A1 | 11/1983 |
| DE | 3535394 A1 | 6/1986 |
| DE | 19718480 A1 | 11/1997 |
| DE | 20 2004 011 085 U1 | 9/2004 |
| DE | 10321387 A1 | 12/2004 |
| DE | 102008023789 A1 | 11/2009 |
| EP | 0066040 A1 | 12/1982 |
| EP | 161326 A1 | 11/1985 |
| EP | 0212552 A2 | 3/1987 |
| EP | 0797863 A1 | 10/1997 |
| EP | 1084772 A1 | 3/2001 |
| EP | 1102385 A2 | 5/2001 |
| EP | 1353436 A2 | 10/2003 |
| EP | 1447901 A2 | 8/2004 |
| EP | 1906054 A1 | 4/2008 |
| EP | 2133981 A2 | 12/2009 |
| EP | 2180583 A1 | 4/2010 |
| FR | 2574499 A1 | 6/1986 |
| FR | 2756118 A1 | 5/1998 |
| FR | 2766027 A1 | 1/1999 |
| GB | 745911 A | 3/1956 |
| GB | 1340362 A | 12/1973 |
| GB | 1385423 A | 2/1975 |
| GB | 1433748 A | 4/1976 |
| GB | 1443530 A | 7/1976 |
| GB | 1516862 A | 7/1978 |
| GB | 2062112 A | 5/1981 |
| GB | 2078016 A | 12/1981 |
| GB | 2237339 A | 5/1991 |
| GB | 2297870 A | 8/1996 |
| GB | 2400410 A | 10/2004 |
| GB | 2437568 A | 10/2007 |
| GB | 2439111 A | 12/2007 |
| GB | 2 448 598 A | 10/2008 |
| GB | 2457682 A | 8/2009 |
| GB | 2462489 A | 2/2010 |
| JP | 48053200 | 7/1973 |
| JP | 55-082836 | 6/1980 |
| JP | 57-097940 | 6/1982 |
| JP | 57-200746 | 12/1982 |
| JP | 58-217843 | 12/1982 |
| JP | 58-217842 | 12/1983 |
| JP | 59153459 | 9/1984 |
| JP | 60125456 | 7/1985 |
| JP | 61-099738 | 5/1986 |
| JP | 61-140638 | 6/1986 |
| JP | 61173662 A | 8/1986 |
| JP | 61-281933 | 12/1986 |
| JP | 04-128622 A | 4/1992 |
| JP | 04362226 A | 12/1992 |
| JP | 07264838 | 10/1995 |
| JP | 09074777 | 3/1997 |
| JP | 09-317827 | 12/1997 |
| JP | H10306831 A | 11/1998 |
| JP | 2001041257 A | 2/2001 |
| JP | 2001268706 A | 9/2001 |
| JP | 2001-286007 A | 10/2001 |
| JP | 2004211754 A | 7/2004 |
| JP | 2005-295711 A | 10/2005 |
| JP | 2005315370 A | 11/2005 |
| JP | 05168222 B2 | 3/2013 |
| NL | 8501670 A | 1/1987 |
| SU | 582429 A1 | 11/1977 |
| SU | 664074 A1 | 5/1979 |
| SU | 1420268 A1 | 8/1988 |
| WO | 9619035 A1 | 6/1996 |
| WO | 00/74203 A1 | 12/2000 |
| WO | 0147091 A1 | 6/2001 |
| WO | 2005064777 A1 | 7/2005 |
| WO | 2006/121761 A2 | 11/2006 |
| WO | 2007029905 A2 | 3/2007 |
| WO | 2007107691 A1 | 9/2007 |
| WO | 2007135360 A1 | 11/2007 |
| WO | 2007/138353 A2 | 12/2007 |
| WO | 2007144556 A1 | 12/2007 |
| WO | 2008076694 A2 | 6/2008 |
| WO | 2009/010819 A1 | 1/2009 |
| WO | 2009071922 A2 | 6/2009 |
| WO | 2009/087408 A2 | 7/2009 |
| WO | 2009087409 A1 | 7/2009 |
| WO | 2009/148918 A2 | 12/2009 |
| WO | 2010094912 A1 | 8/2010 |

OTHER PUBLICATIONS

Written Opinion from PCT/GB2010/000590 dated Aug. 3, 2010 (6 pages).
Search Report issued in corresponding British Application No. GB0905344.8; Dated Jul. 23, 2009 (3 pages).
British Search and Examination Report for Application No. GB1310874.1 dated Jul. 21, 2013.
British Search and Examination Report for Application No. GB1310875.8 dated Jul. 21, 2013.
British Search and Examination Report for Application No. GB1310876.6 dated Jul. 21, 2013.
Chinese Office Action for Application No. 201080022351.2 dated Apr. 9, 2013.
Chinese Office Action for Application No. 201080022344.2 dated Mar. 4, 2013.
Extended European Search Report for Application No. 13174994.7 dated Sep. 9, 2013.
GB Search Report issued in corresponding application No. GB0918384.9, dated Jan. 29, 2010, 4 pages.
International Search Report from PCT/GB2008/004050 dated May 27, 2009 (7 pages).
International Search Report from PCT/GB2010/000591 dated Aug. 3, 2010 (3 pages).
International Search Report from PCT/GB2010/000592 dated Aug. 3, 2010 (3 pages).
International Search Report from PCT/GB2010/002124 dated Apr. 17, 2012 (3 pages).
International Search Report issued in PCT/EP2010/065781, mailed Dec. 28, 2010, 7 pages.
International Search Report issued in PCT/EP2010/065791, mailed Mar. 23, 2011, 8 pages.
International Search Report issued in PCT/EP2011/070410 mailed on Mar. 13, 2012 (2 pages).
Japanese Office Action for Application No. 2012-501384 dated Dec. 24, 2013.
Search Report issued in corresponding application GB0918386.4. dated Jan. 27, 2010. 4 pages.

(56) References Cited

OTHER PUBLICATIONS

Written Opinion from PCT/GB2008/004050 dated May 27, 2009 (10 pages).
Written Opinion from PCT/GB2010/000591 dated Aug. 3, 2010 (6 pages).
Written Opinion from PCT/GB2010/000592 dated Aug. 3, 2010 (8 pages).
Written Opinion issued in PCT/EP2010/065781, mailed Dec. 28, 2010, 7 pages.
Written Opinion issued in PCT/EP2010/065791, mailed Mar. 23, 2011, 10 pages.
Written Opinion of the International Searching Authority issued in PCT/EP2011/070410 mailed on Mar. 13, 2012 (6 pages).
U.S. Amendment for U.S. Appl. No. 13/260,678 dated Mar. 12, 2014.
U.S. Amendment for U.S. Appl. No. 13/260,678 dated Oct. 25, 2013.
U.S. Final Office Action for U.S. Appl. No. 13/260,678 dated Dec. 24, 2013.
U.S. Non-Final Office Action for U.S. Appl. No. 13/260,678 dated Mar. 28, 2014.
U.S. Non-Final Office Action for U.S. Appl. No. 13/260,678 dated Apr. 29, 2013.
U.S. Preliminary Amendment for U.S. Appl. No. 13/260,678 dated Sep. 27, 2011.
U.S. Restriction Requirement for U.S. Appl. No. 13/260,678 dated Mar. 6, 2013.
U.S. Response to Restriction for U.S. Appl. No. 13/260,678 dated Apr. 8, 2013.
U.S. Interview Summary for U.S. Appl. No. 13/260,678 dated Mar. 6, 2014.

* cited by examiner

FLYWHEEL

The invention relates to a flywheel and a method for constructing a flywheel for energy storage.

BACKGROUND OF THE INVENTION

Flywheels are known for the storage of energy in the form of kinetic energy, for example for use in vehicles. In such instances it is known to use a flywheel to store the energy which would otherwise be converted to heat in the vehicle's braking system when the vehicle decelerates, this stored energy then being available for use to accelerate the vehicle when desired.

An existing type of flywheel according to FIG. 1 has a central metallic support section (1) which can be mounted on a central support such as a shaft. At least one composite ring (2) is mounted on the central support section. The composite ring in this type of flywheel is filament wound from carbon fibre. When the flywheel is in rotation, the ring will tend to expand in diameter due to the centrifugal forces acting on it. The ring has high strength in hoop for re-acting the centrifugal forces when the flywheel is in rotation. However, the outer ring can become a loose fit on the central support section and potentially (dangerously) become dismounted from the central support section. In addition the radial stress can result in failure of the composite ring.

In order to counteract the tendency of the ring to grow, the ring is typically machined with a smaller inner diameter than the outer diameter of the central support section and is then mounted onto the central support section with an interference fit. The mismatch in diameters results in a pre-load such that that ring exerts an inward force onto the central support section. This inward preload is greatest when the flywheel is not rotating and results in a requirement for the central support section to be sufficiently structurally strong that it can withstand the preload force when the flywheel is stationary. It is known for more than one composite ring to be pressed together and further mounted onto the central support. The pre-load increases towards the centre of the flywheel and with the number of rings pressed together. Consequently a large amount of material may be required in the central support section of the flywheel in order to counteract this pre-load force, and this material, being near the centre of the flywheel, adds only very inefficiently to the rotational inertia of the flywheel. Further, if the hub is stiffer than the composite ring, as the speed of the flywheel increases and the pre-load reduces then the increased mass will lead to stress management problems in the hub.

Yet further, in the existing system, exceeding the maximum stress rating of the composite ring will result in failure. In the flywheel type above, the central support section exerts an outward force on the composite ring due to the pre-load. This force is in the same direction as the centrifugal forces acting on the ring when the flywheel is in rotation. Then, if the stiffness of the hub is lower than the composite ring, the ring must be strong enough to counteract the sum of the preload force and the centrifugal forces when the flywheel is rotating at maximum speed. A further problem with this type of flywheel is therefore that the preload reduces the maximum rotation speed of the flywheel.

A further problem with existing systems is that if a flywheel is to be coupled to, for example, a vehicle transmission, a splined coupling is normally required in order that high transient torque levels (for example when the vehicle gearbox ratio is changed quickly, thus requiring the flywheel to accelerate or decelerate rapidly) may be transmitted to the flywheel without slippage.

A flywheel of the type described in UK patent application 0723996.5, filing date 7 Dec. 2007, overcomes the aforementioned limitations by providing a flywheel having a drive transfer element and a rim comprising a mass element, where the rim and the drive transfer element are coupled by a winding. However, it is desirable with this type of flywheel to have an indication of stress in the flywheel components as the flywheel is rotated at increasing speed.

UK patent application 0902840.8 provides such an aforementioned indication of stress in the flywheel components by incorporating a warning, or indicator, ring into the flywheel. The indicator ring can be mounted to the flywheel with an interference fit, such that residual stresses are set up between the ring and the flywheel. The level of interference fit, or preload, and the relative stiffnesses of the ring and the part of the flywheel onto which the ring is mounted, are chosen such that when the flywheel is rotated at or in excess of a predetermined trigger speed, the preload is substantially overcome by centrefugal forces, causing the ring and support member to at least partially separate. The ring is then able to move on the flywheel, causing an "out of balance" condition, resulting in a vibration which is detectable as an indication of stress in the flywheel components.

A further problem with existing flywheels is the need to finely balance the rotating mass of the flywheel. Since the kinetic energy stored in a rotating flywheel is proportional to $\omega^2$ (where $\omega$ is the angular velocity of the flywheel), increasing the maximum rotational speed of a flywheel allows more energy to be stored in a flywheel of a given mass, and thereby increases the energy storage density of such a flywheel. However, as the rotational speed increases, the balance of the assembly becomes more critical, as does proving the structural integrity of the flywheel. Furthermore, the cost of balancing a flywheel generally increases with the level of accuracy of balance required.

A further problem when balancing composite flywheels, such as the type described in UK patent applications 0723996.5 and 0902840.8, is that only a limited amount of machining/processing can be performed on the composite component (i.e. the mass bearing rim) without severely affecting the structural integrity of the composite. This thereby affects the simplicity of the balancing process, since material has to be removed from the flywheel at a location away from the composite rim.

A further problem is that existing methods for balancing flywheels generally incorporate machining and/or grinding and/or drilling of material from the flywheel. Not only can (as previously mentioned) such machining and flash or grinding and/or drilling of material from a composite flywheel compromise the structural integrity of the composite part, but furthermore, such machining limits the accuracy of balancing obtainable in at least the following two ways. Firstly, the accuracy of the balancing operation is limited by the trueness of the lathe shaft onto which the flywheel is mounted during the machining operation, and by the accuracy of the mounting of the flywheel mass to the lathe shaft. Secondly, the balancing accuracy is limited by the minimum thickness of material which can be removed in the machining/grinding/drilling process, which in turn may be affected by the skill of the operator and/or (if the machine tool is computer numerically controlled) by the precision of the CNC machine. This is made more acute, since the material removed from the flywheel is necessarily dense (in order to maximise the energy storage density of the flywheel).

It is desirable therefore for a method to be found for simply and quickly balancing such a flywheel to a high degree of accuracy. It is also desirable that the method should simultaneously prove the structural integrity of the flywheel. Such a method would save time, production cost, capital cost, and would also increase the performance and reliability of the flywheel.

Existing flywheels are sometimes constructed such that the rotating mass of the flywheel rotates inside a chamber containing a vacuum. Operating the rotating mass inside a vacuum is advantageous since it reduces energy losses due to air resistance (also known as windage). However, in order to transfer energy into and out of the rotating flywheel mass, a coupling means is required. Some existing flywheels use a rotating shaft passing through a rotating seal in the vacuum chamber to couple torque from an energy source to the flywheel energy storage means. Rotating seals are never perfect, however, since they inevitably leak and therefore require an environmental management system to be coupled to the vacuum chamber in order to maintain the vacuum despite leakage. Furthermore, the seals become more "leaky" with age and as rotational speed increases, and also wear more quickly at higher speeds. The use of rotating seals is therefore undesirable. The mass, volume and cost of such an environmental management system is undesirable.

Magnetic couplings can be used with flywheels to transfer torque through a vacuum chamber wall, thereby obviating the need for rotating seals. However, the torque transmission capability of such magnetic couplings using permanent magnets has previously been found to be lacking in torque transmission capability.

This has been found to be at least partly because the magnetic flux which passes between the poles of the two rotating members, for a given magnetic pole strength, is limited by the "air gap" between the two members. The air gap in fact, comprises the air gap between the outer rotating member and the vacuum wall, the vacuum wall itself, and a vacuum gap between the vacuum wall and the inner rotating member. Since the vacuum chamber wall must be structurally strong enough to support atmospheric pressure, its thickness is necessarily significant, resulting in a large "air gap" between the inner and outer rotating members.

Existing arrangements have sought to overcome this limited torque coupling capability by employing electromagnetic poles in order to increase the magnetic strength and thereby increase torque coupling capability. However, the use of electromagnetic poles requires an energy conversion, thereby reducing the efficiency of the energy storage flywheel (since the electromagnets require electrical power to operate them, which must be sourced from the energy stored in the flywheel). Furthermore, the additional control and power electronics associated with electromagnetic couplings significantly increases the size, and weight of a flywheel energy storage system incorporating such an electromagnetic coupling, thereby further reducing the energy storage density of such a flywheel energy storage system, both in terms of mass and volume. A method of coupling energy into and out of an energy storage flywheel operating in a vacuum chamber, which is efficient in terms of mass, volume and energy is therefore required.

A further problem with existing flywheels is that while the flywheel itself should be able to rotate at a high angular velocity, the drive shaft which invariably couples the flywheel to an energy source or sink (such as an engine or transmission) and associated components which are outside of the vacuum chamber suffer losses associated with air resistance (or "windage").

Magnetic gears use arrays of magnets (for example, permanent magnets) and stationary pole pieces to transfer torque between rotatable members, for example driveshafts. They exhibit reduced wear when compared to conventional mechanical gears. However, their torque transmission capability is dependent on the rotational position of the magnets with respect to each other, and therefore varies as the shafts rotate. For example, when torque transfer capability is plotted on a graph against angular position, severe peaks and troughs in the torque curve can be exhibited. This is known as "cogging" and leads to a set of undesirable characteristics.

Firstly, peaks and troughs in the torque curve lead to the magnetic gear having a variable "pull-out" torque with meshing position. That is, the torque required before the gears will slip out of mesh varies depending on the rotational meshing position. Therefore, such a gear set for transmitting a given level of torque must be designed such that its minimum torque coupling capability, as represented by one of the troughs (shown at around 20 Nm in FIG. 26) in the torque curve, is greater than the design torque handling figure. For this, the magnet arrays must be sized appropriately larger, and this also normally results in excess torque coupling capability at certain meshing positions, representing an inefficiency. Thus, the magnet arrays are normally sized larger than that which would be necessary if the torque curve more closely followed the mean torque handling capacity, thereby increasing their cost and size, and reducing the energy storage density of a flywheel incorporating such a magnetic gear.

Furthermore, since the angular offset between the input and output shafts of a magnetic gear varies according to the torque applied and to the torque coupling capacity at a given meshing position, if the torque coupling capacity varies with meshing position then this will result in a torsional vibration in the shafts. Such a torsional vibration can reduce the life of the associated mechanical components, and/or can result in failure and/or disengagement. This is an especially serious problem if the rotational speed is such that the frequency of the torsional vibration coincides with a resonance of the mechanical system. It would therefore be advantageous if the variation between the peaks and troughs in the torque curve could be reduced or eliminated. This would allow smaller, cheaper, magnet arrays to be used, since the minimum torque coupling capability would then be much closer to the mean torque coupling capability. Torsional vibration of the shafts would also be reduced, allowing cheaper, lighter and smaller components to be used. A flywheel energy storage system employing such smaller, cheaper and lighter components would have a higher energy storage density.

BRIEF DESCRIPTION OF THE INVENTION

In one aspect, embodiments disclosed herein relate to an apparatus for coupling force between first and second movable members, the first movable member has a first array of alternating magnetic poles arranged thereon and the second movable member has a second array of alternating magnetic poles arranged thereon, a magnetic flux coupling means is arranged between the first and second movable members, there is a first spacing between the magnetic flux coupling means and the first movable member and a second spacing between the magnetic flux coupling means and the second movable member, and the magnetic flux coupling means is incorporated in a membrane which is impermeable to fluids and separates the first and second moveable members, the membrane is arranged to enclose a vacuum around a flywheel.

In another aspect, embodiments disclosed herein relate to a method of making a coupler for coupling force between first and second movable members, the method including arranging an array of alternating magnetic poles on each of first and second members, separating the first and second members with a membrane which is impermeable to fluids, wherein the membrane is arranged to enclose a vacuum around a flywheel, and incorporating magnetic flux coupling means in the membrane.

FIGURES

Figure 2:
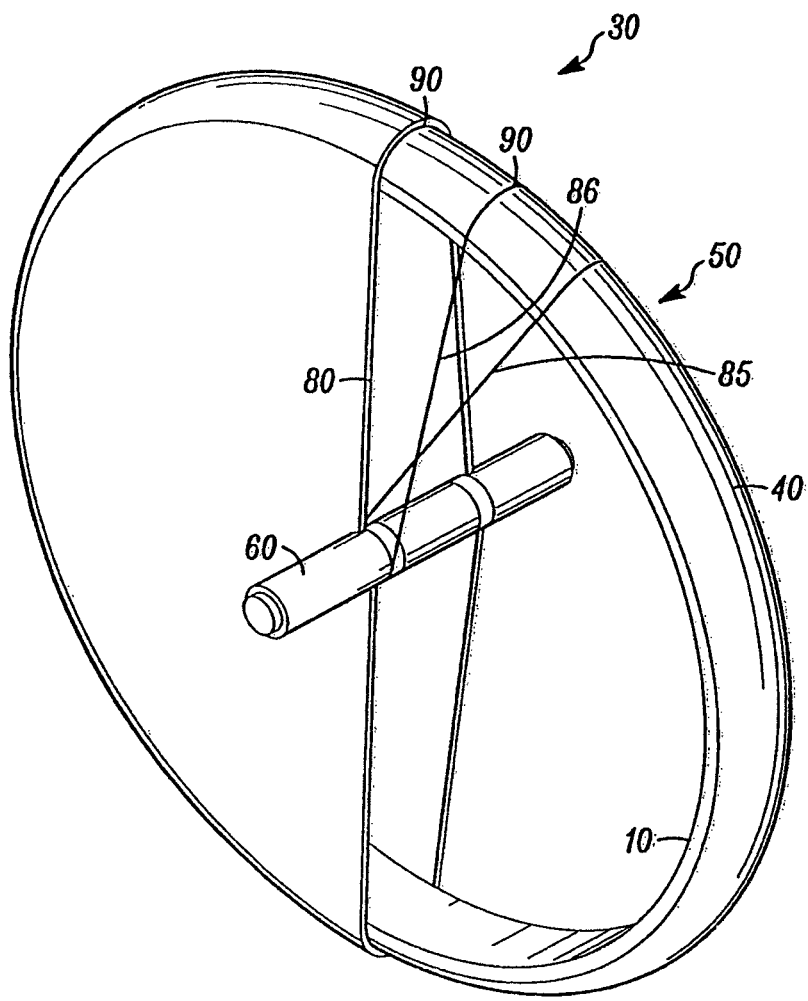
Figure 3:
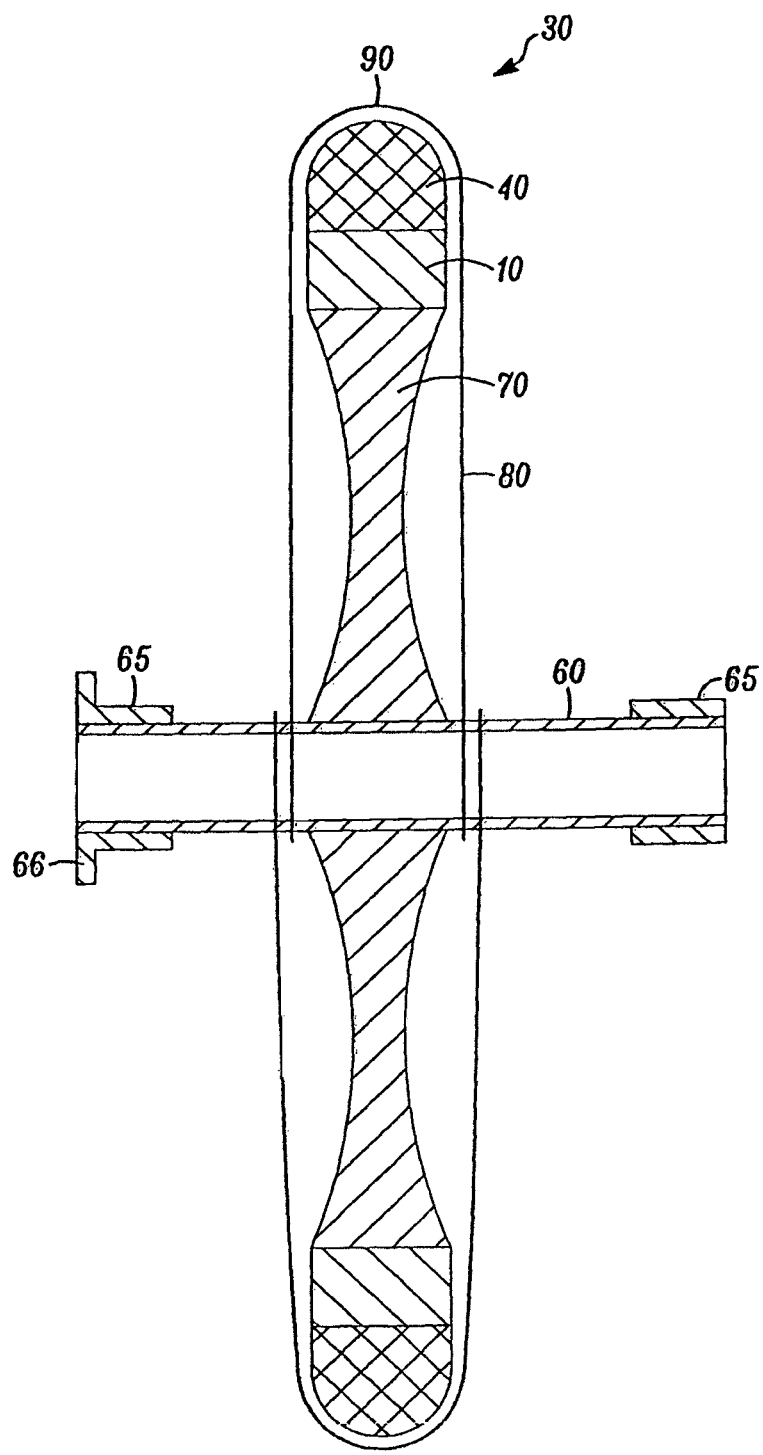
Figure 4:
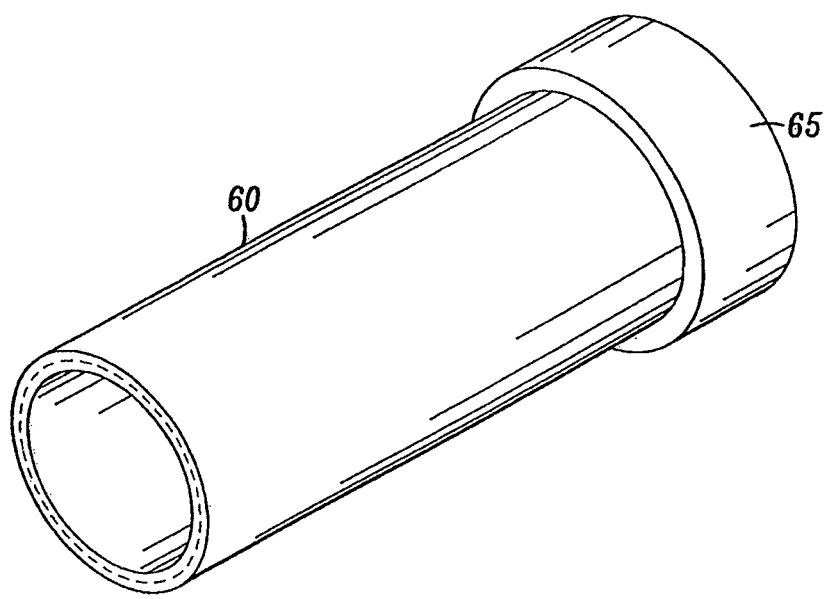
Figure 5:
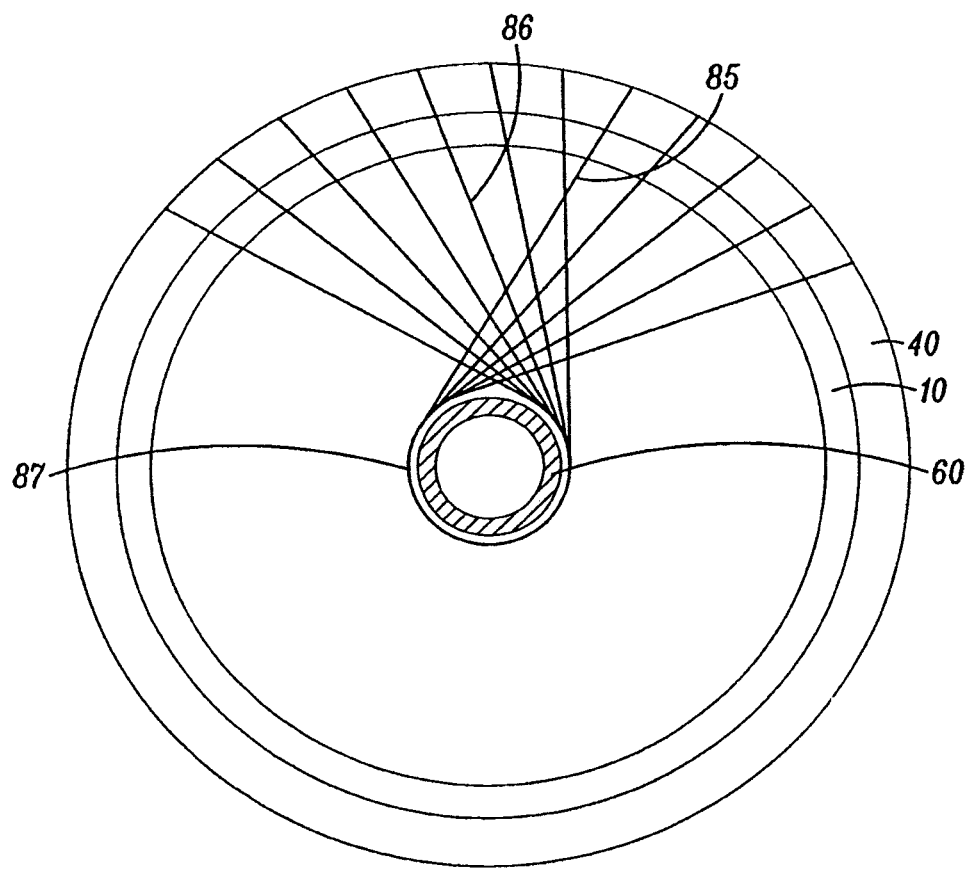
Figure 6:
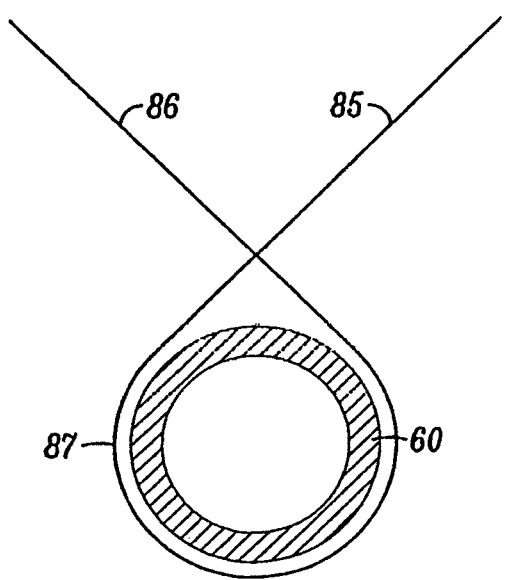
Figure 7:
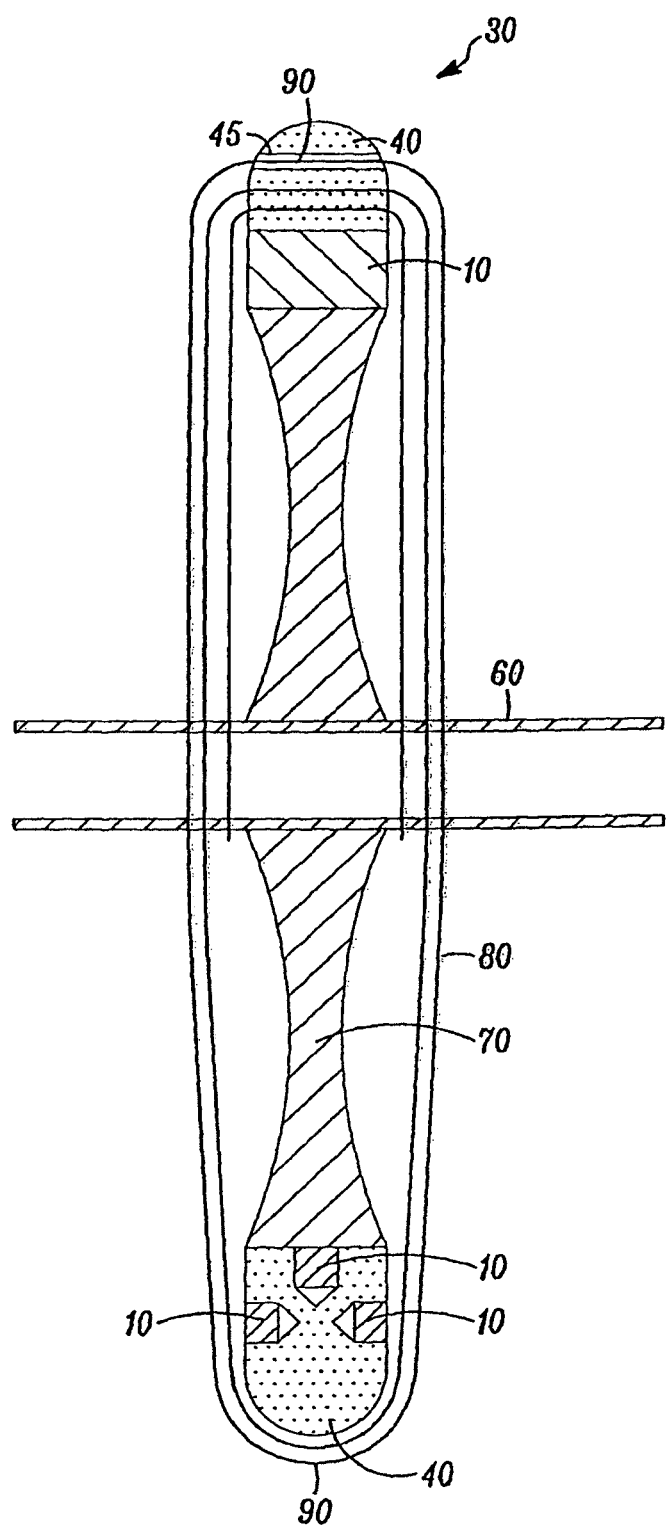
Figure 8:
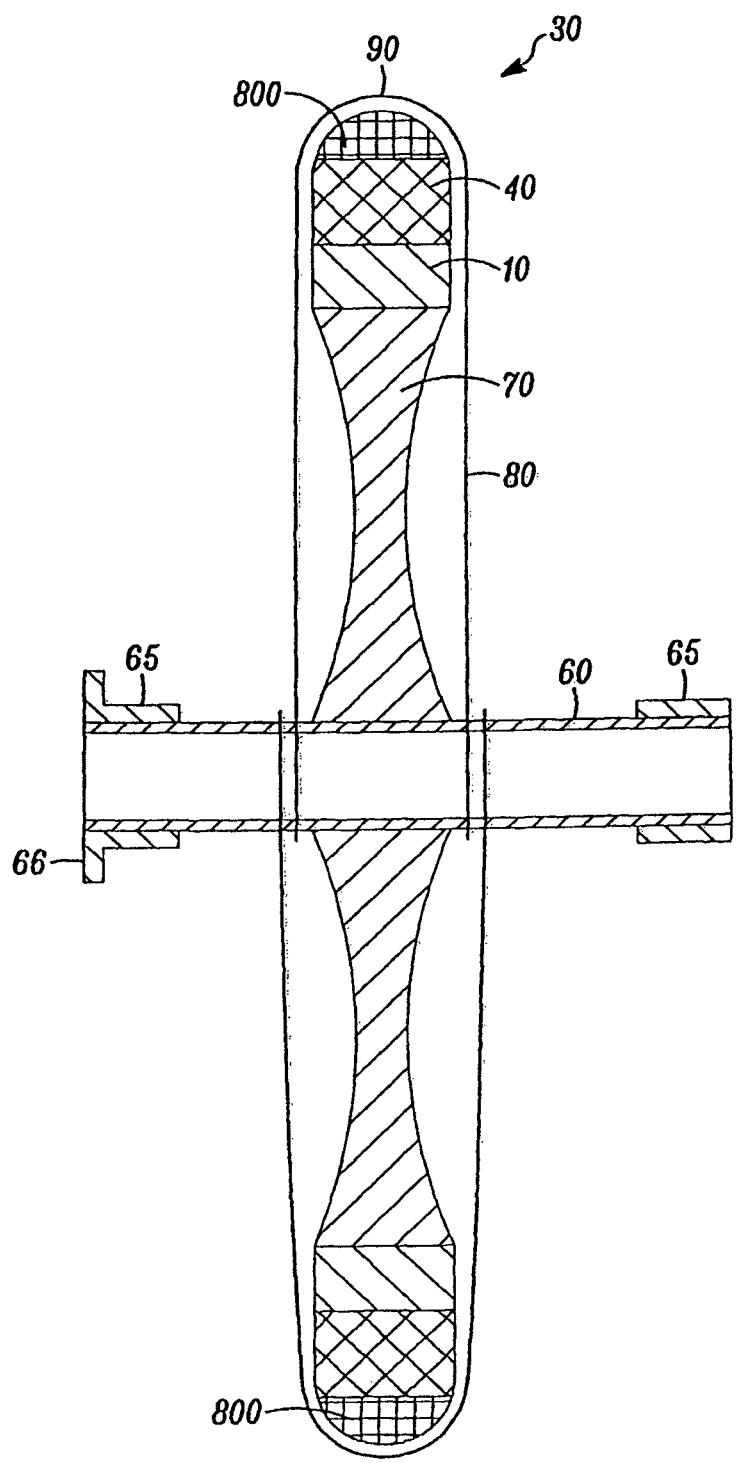
Figure 9:
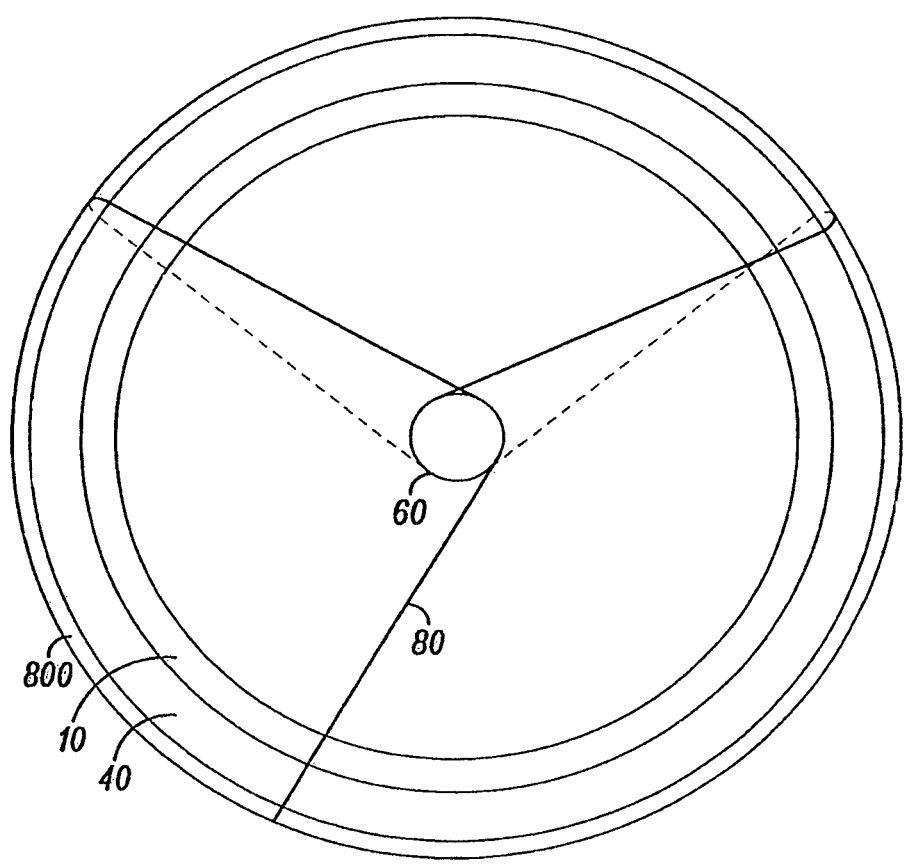
Figure 10:
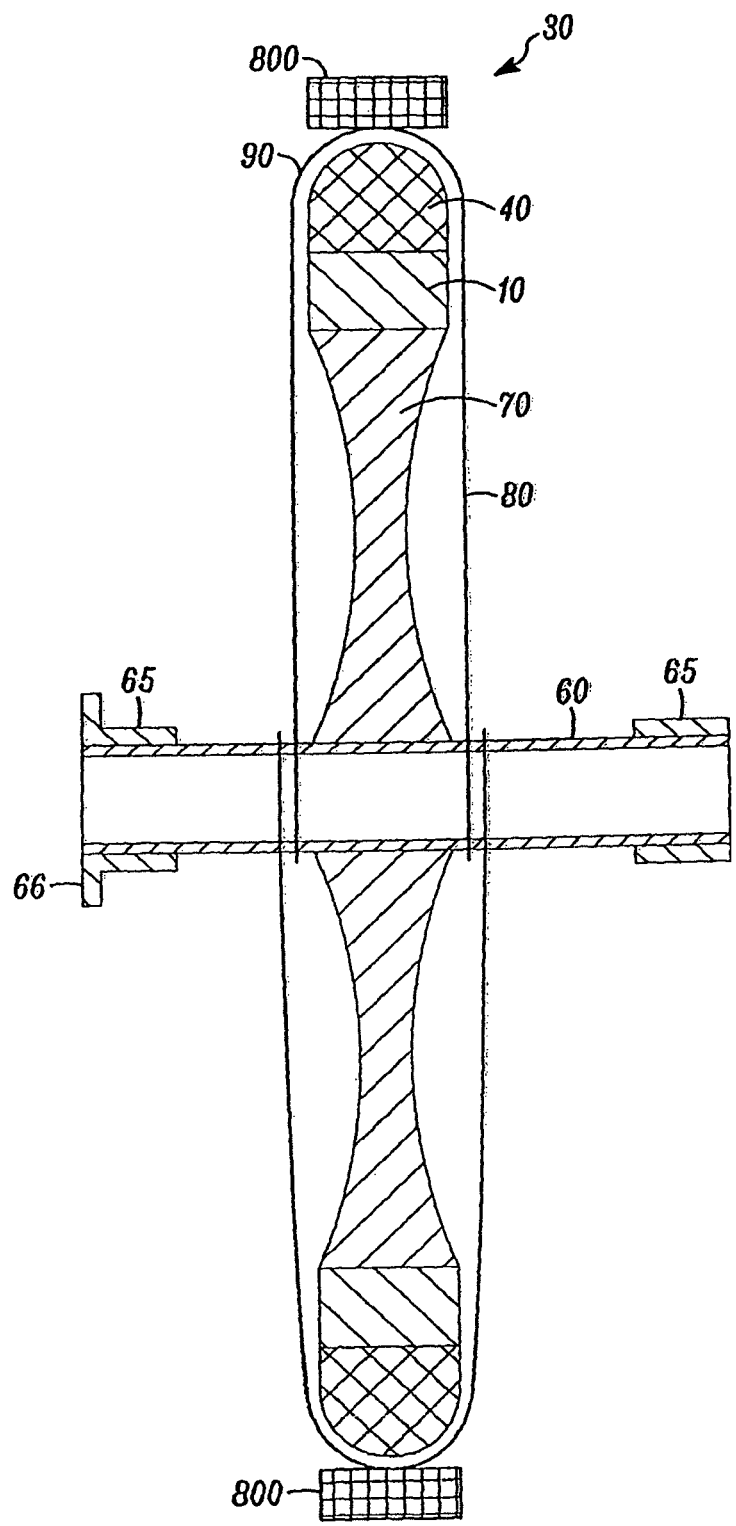
Figure 11:
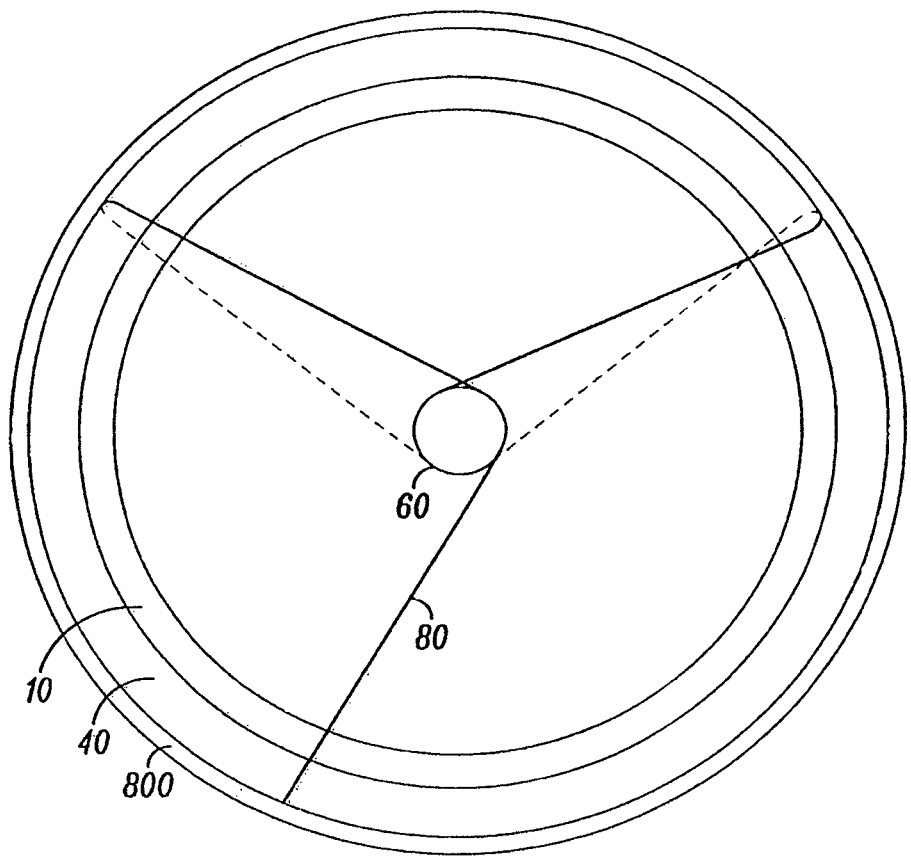
Figure 12:
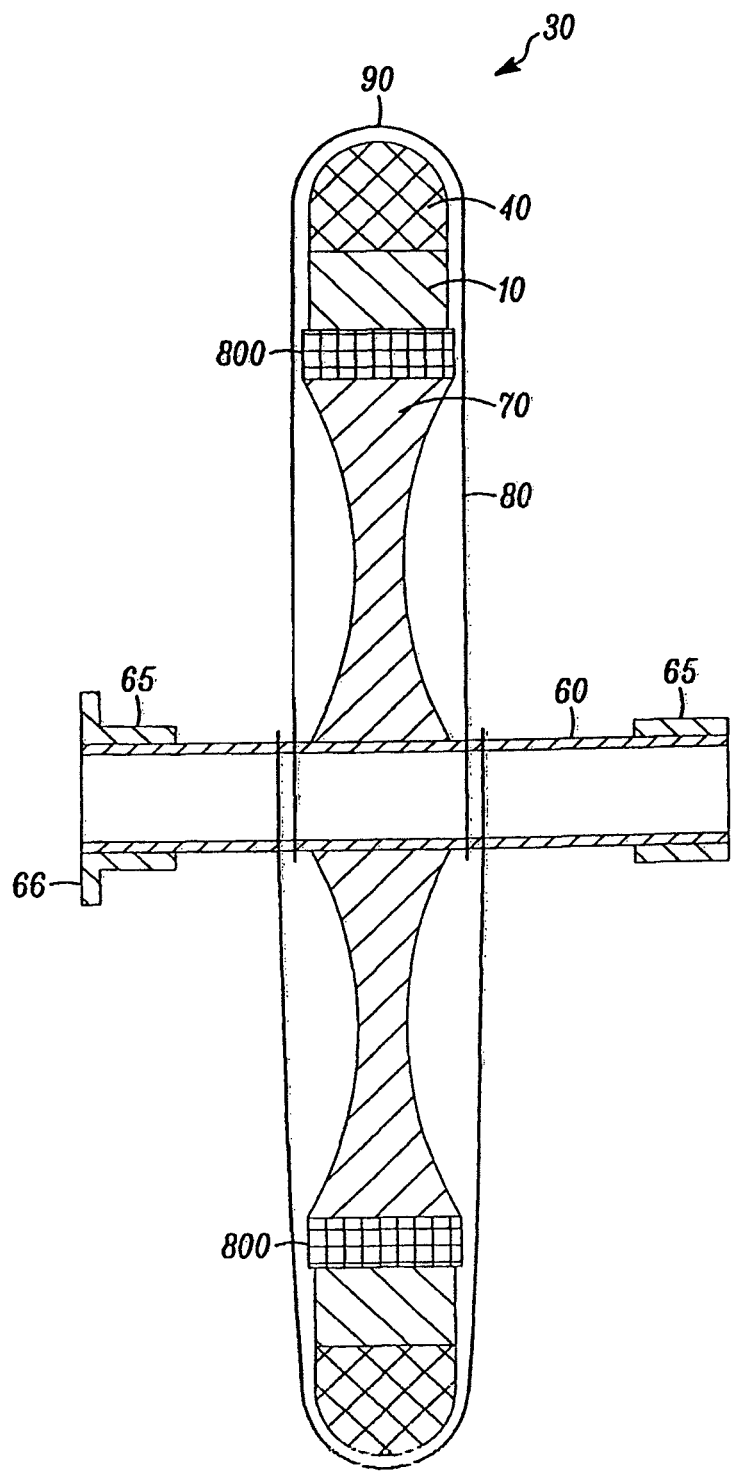
Figure 13:
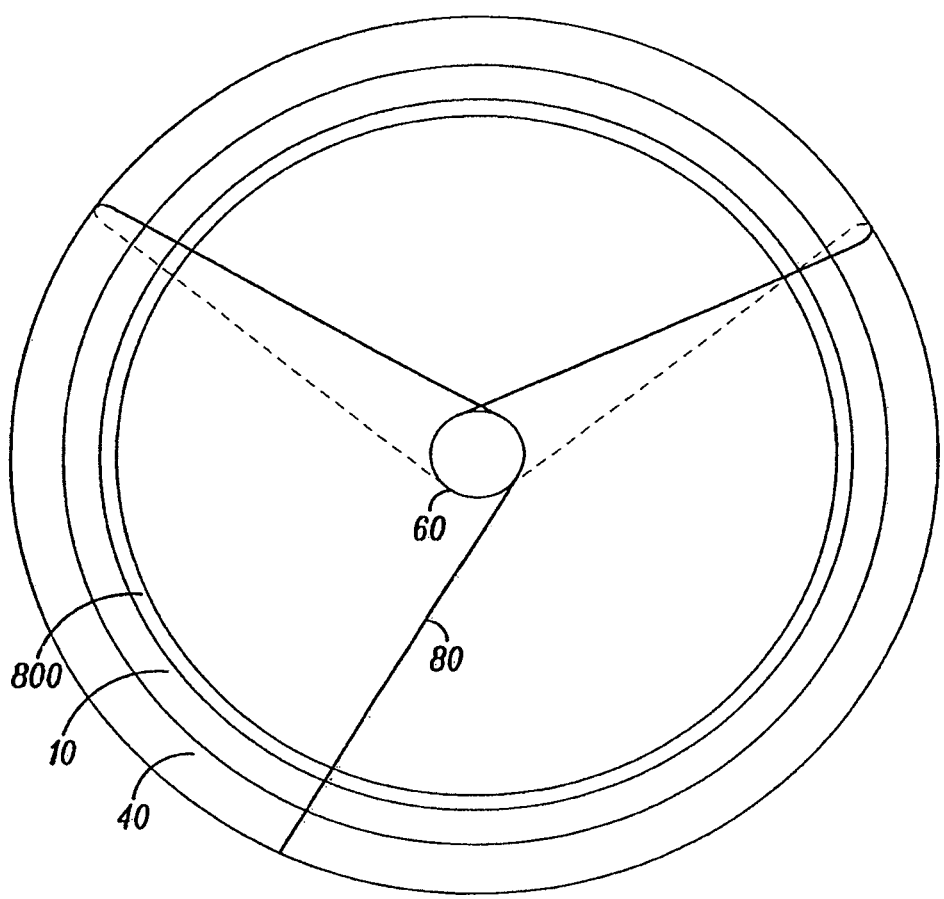
Figure 14:
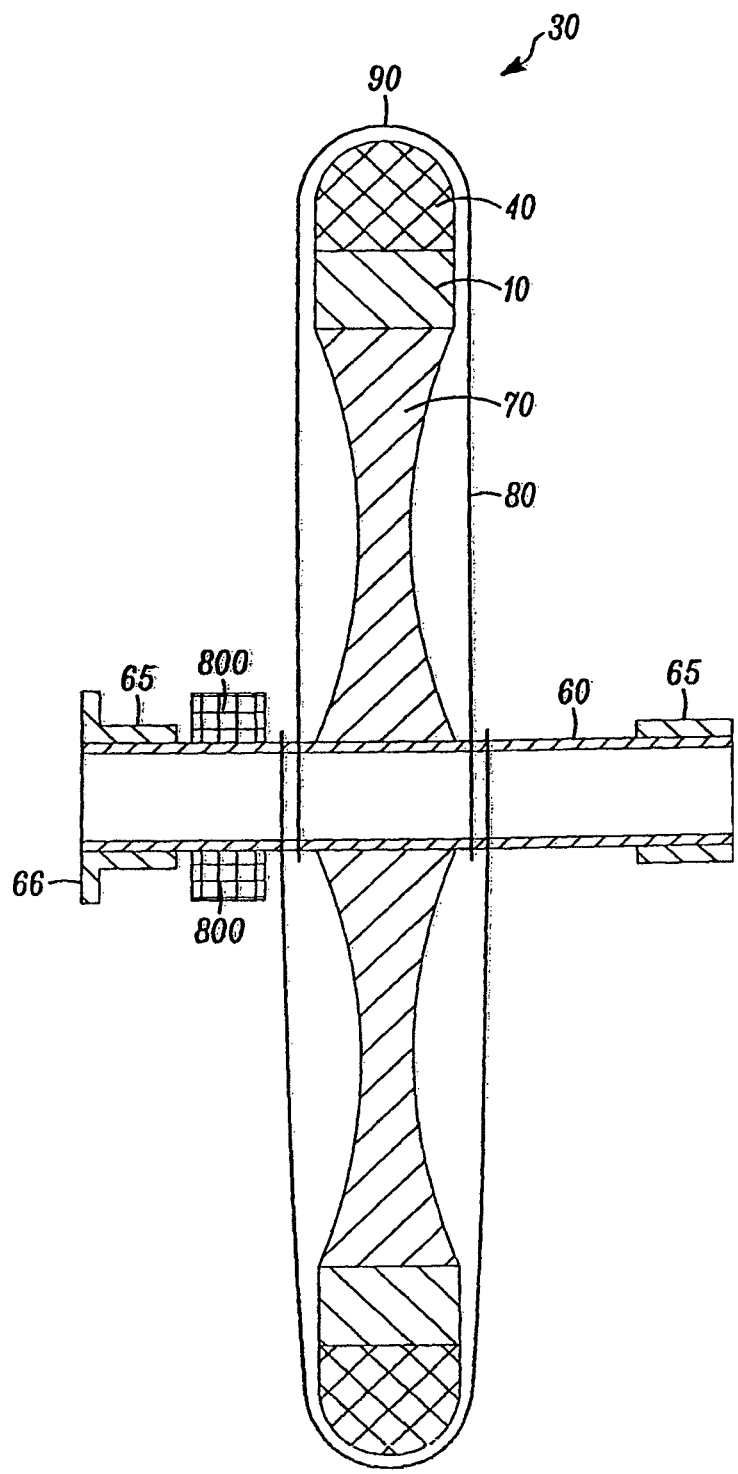
Figure 15:
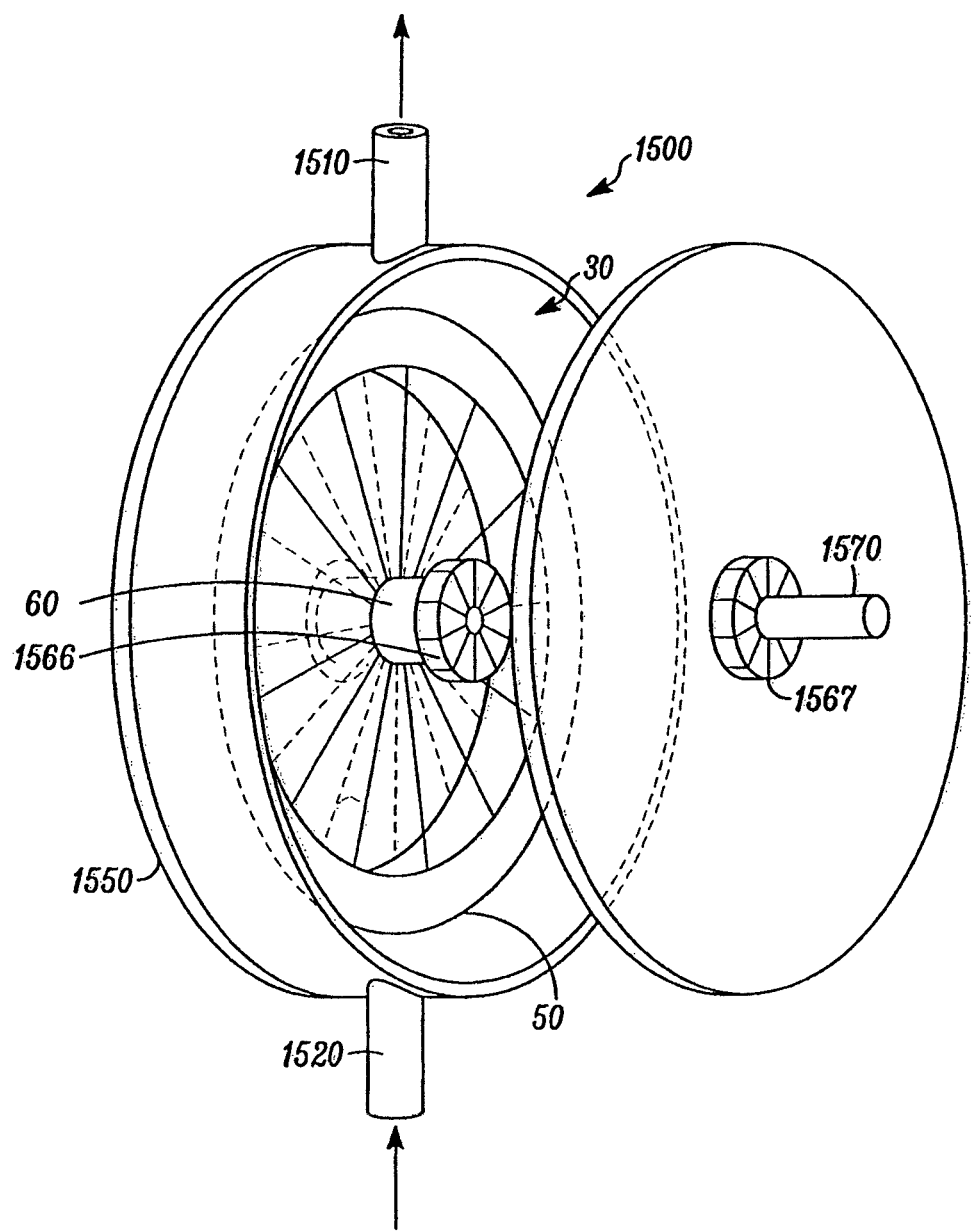
Figure 16:
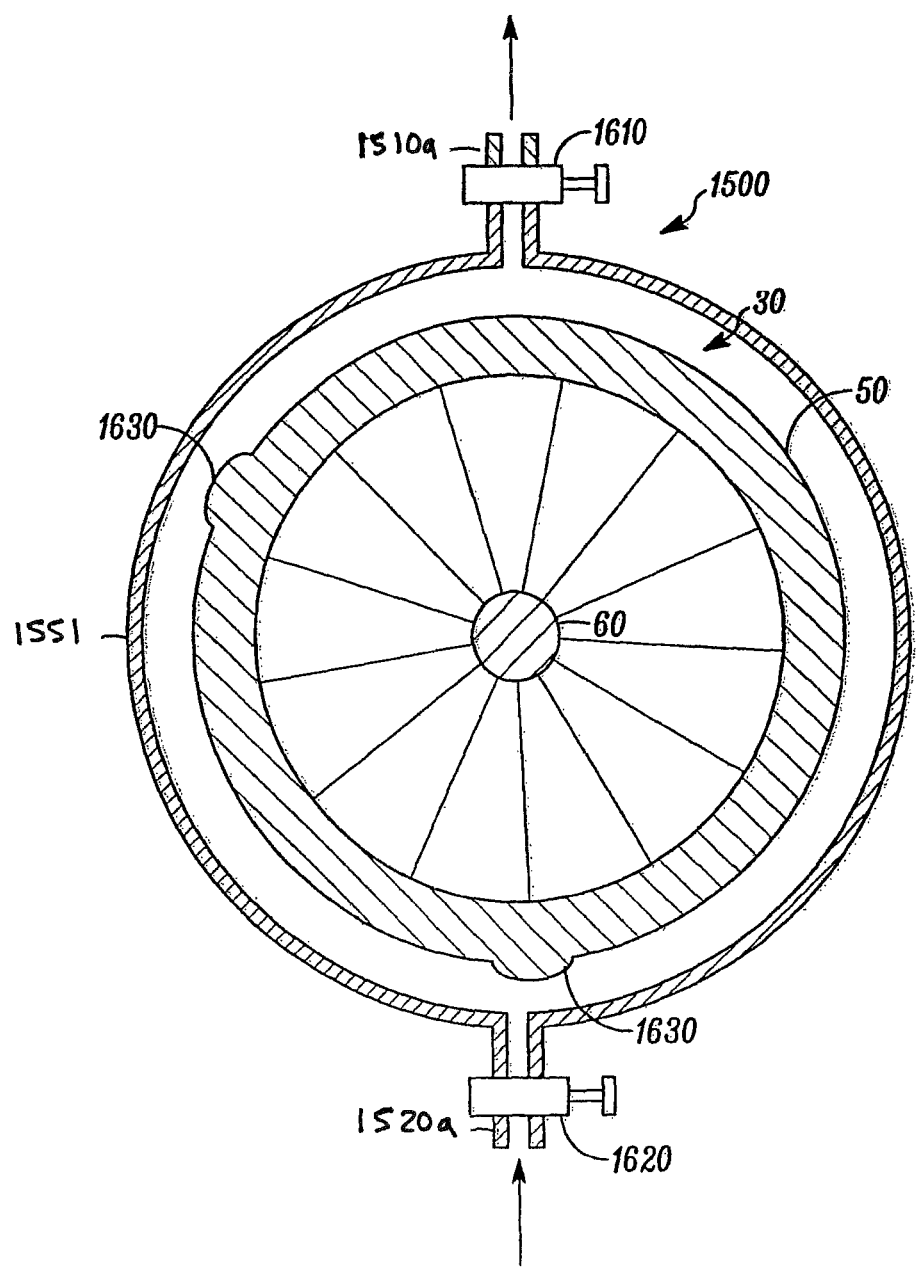
Figure 17A:
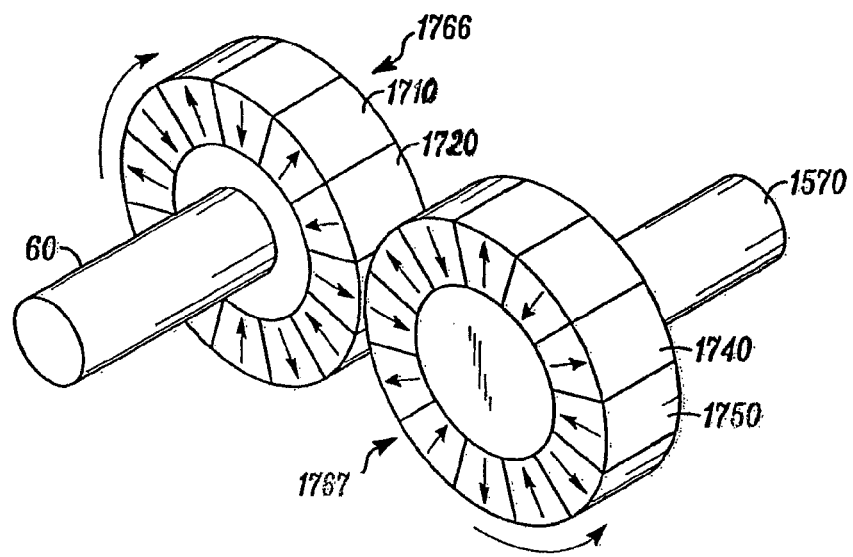
Figure 17B:
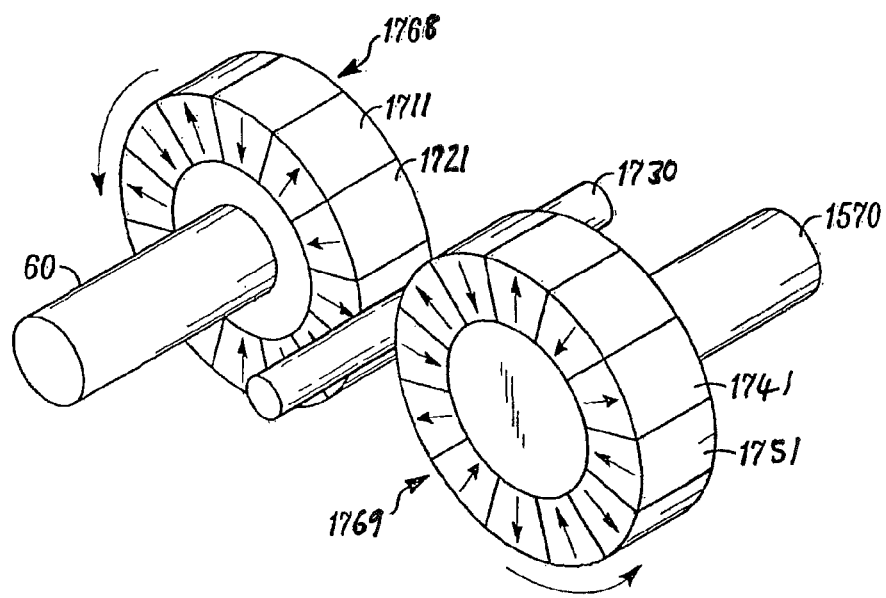
Figure 18A:
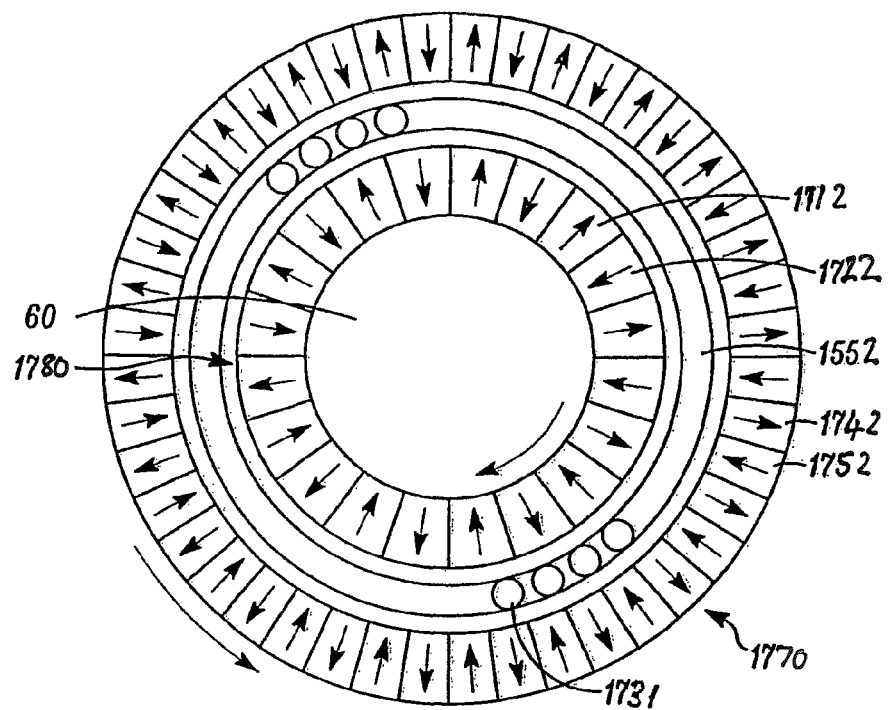
Figure 18B:
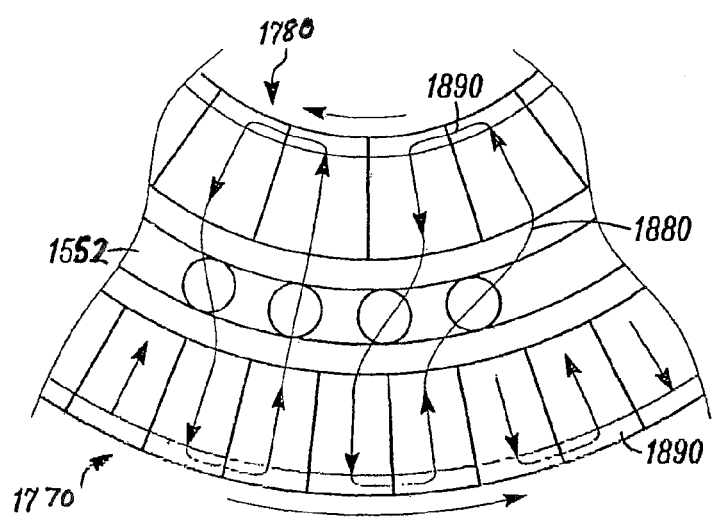
Figure 19A:
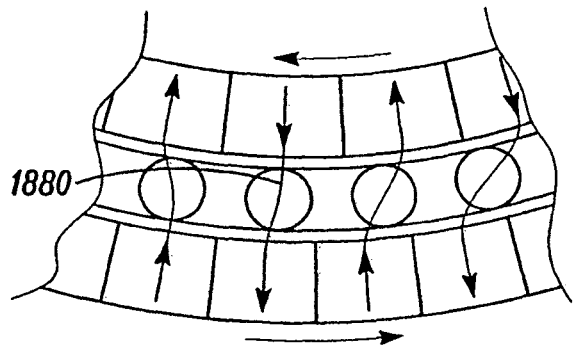
Figure 19B:
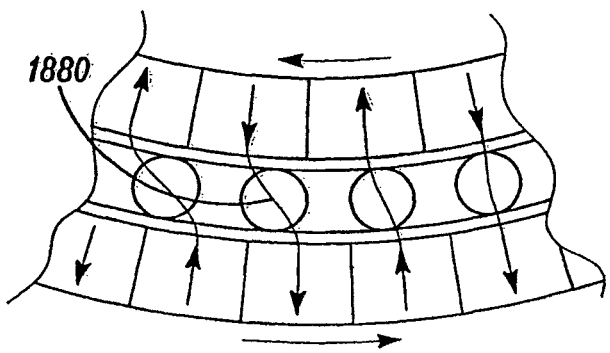
Figure 19C:
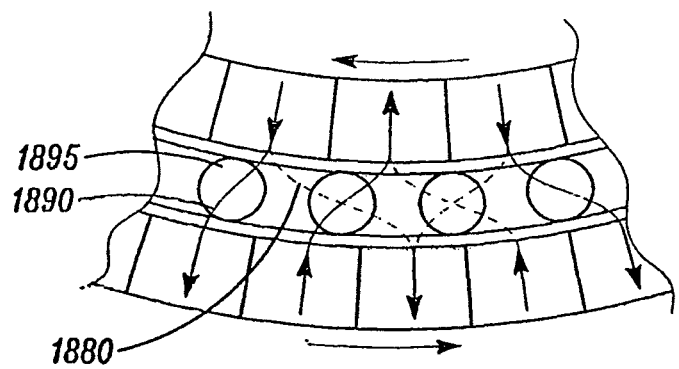
Figure 20:
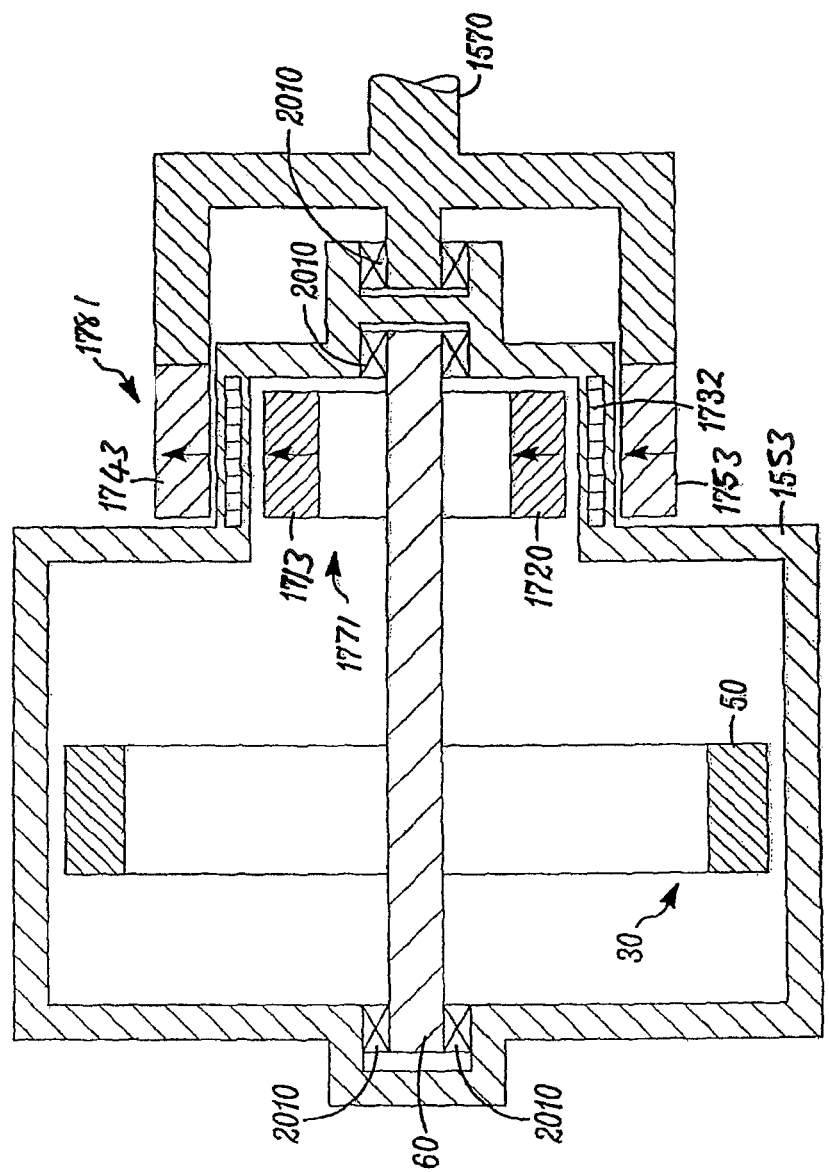
Figure 21:
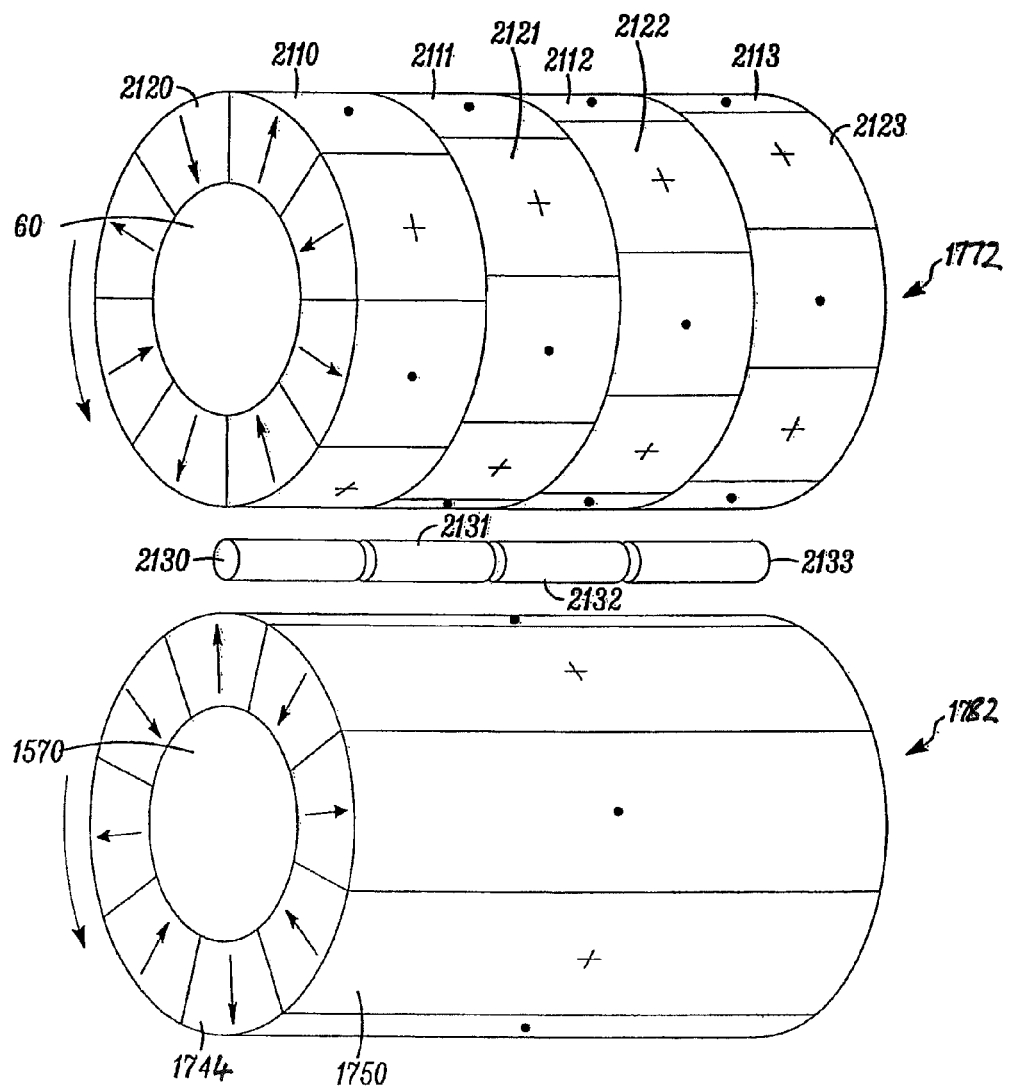
Figure 22:
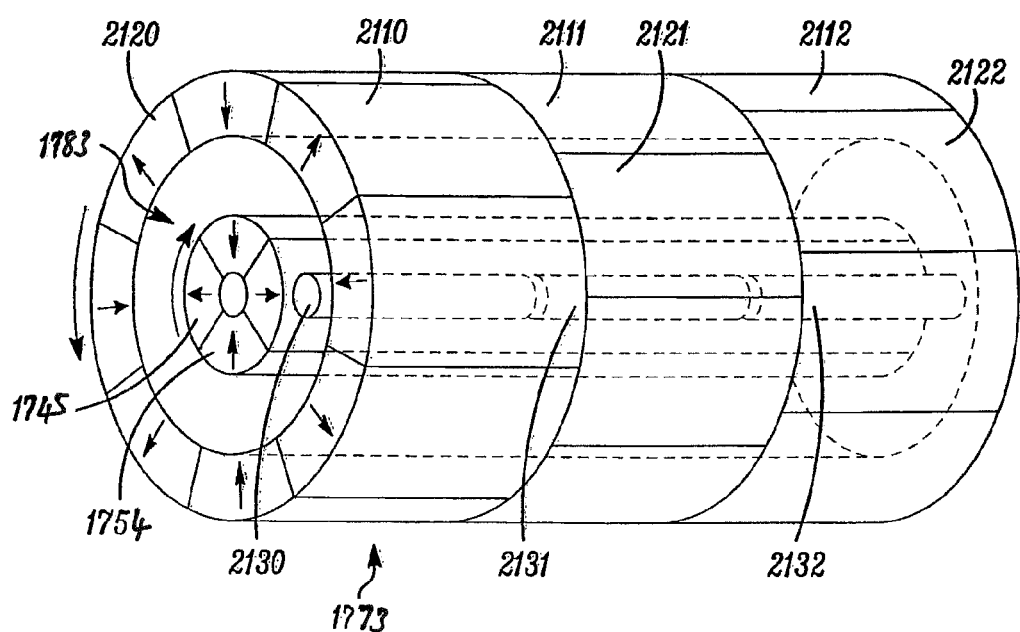
Figure 23:
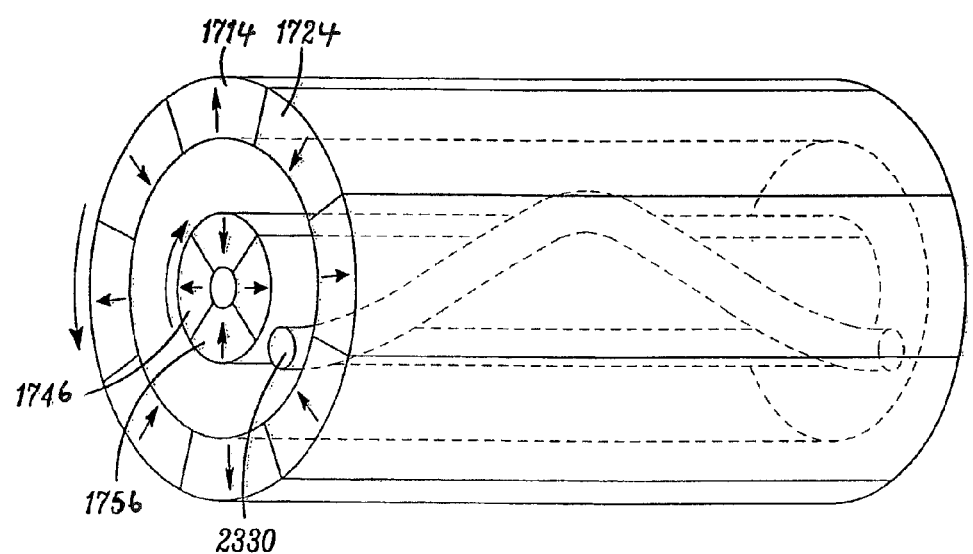
Figure 24:
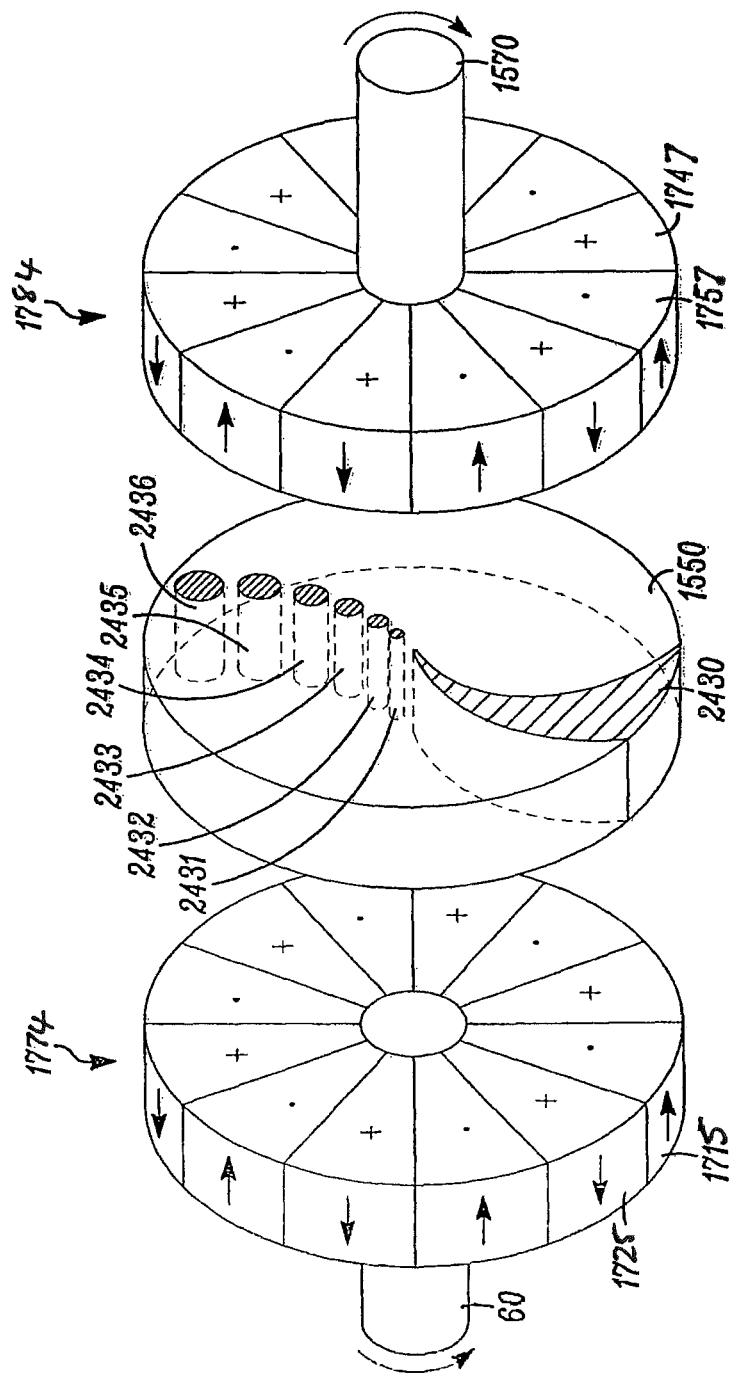
Figure 25:
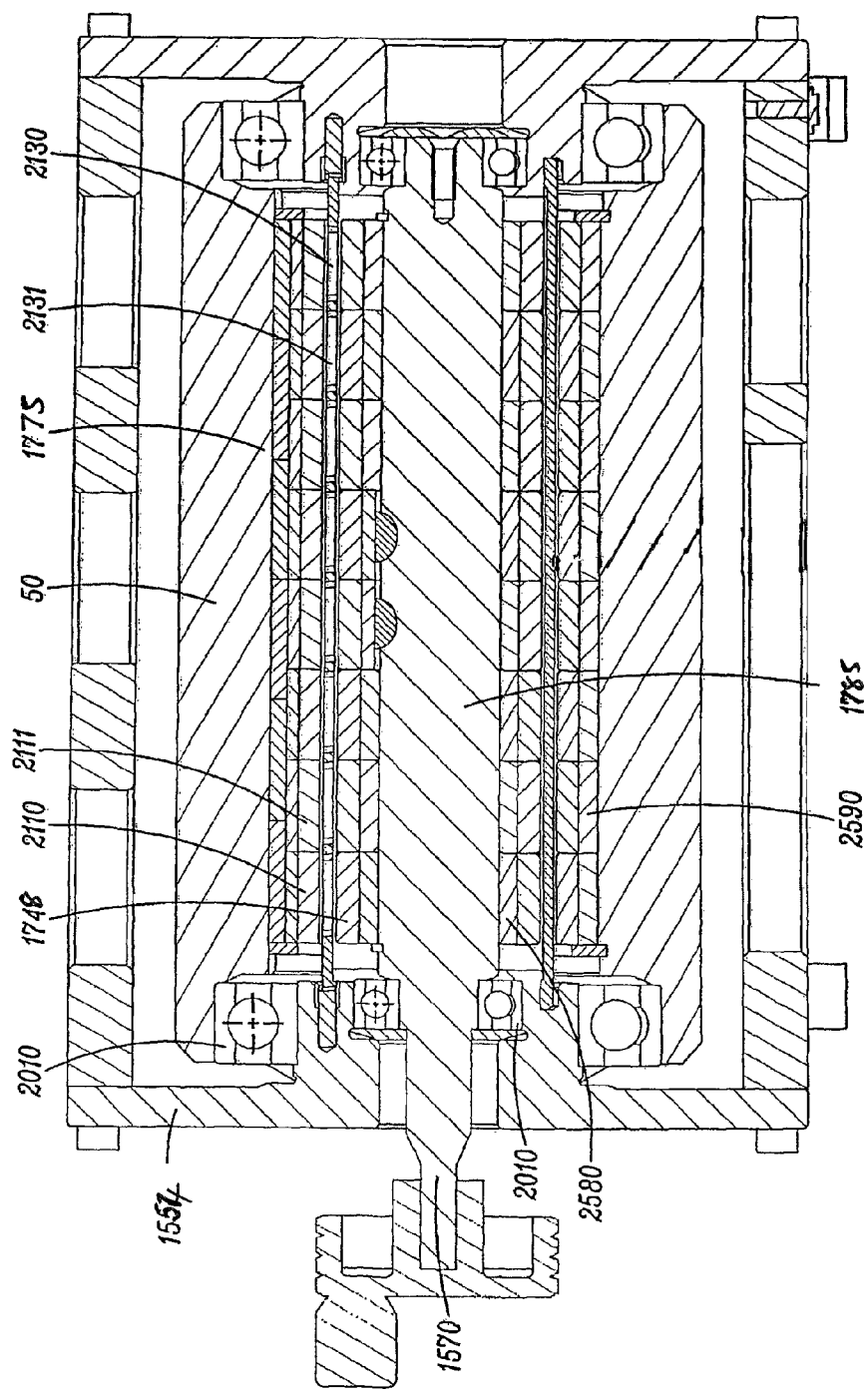
Figure 26:
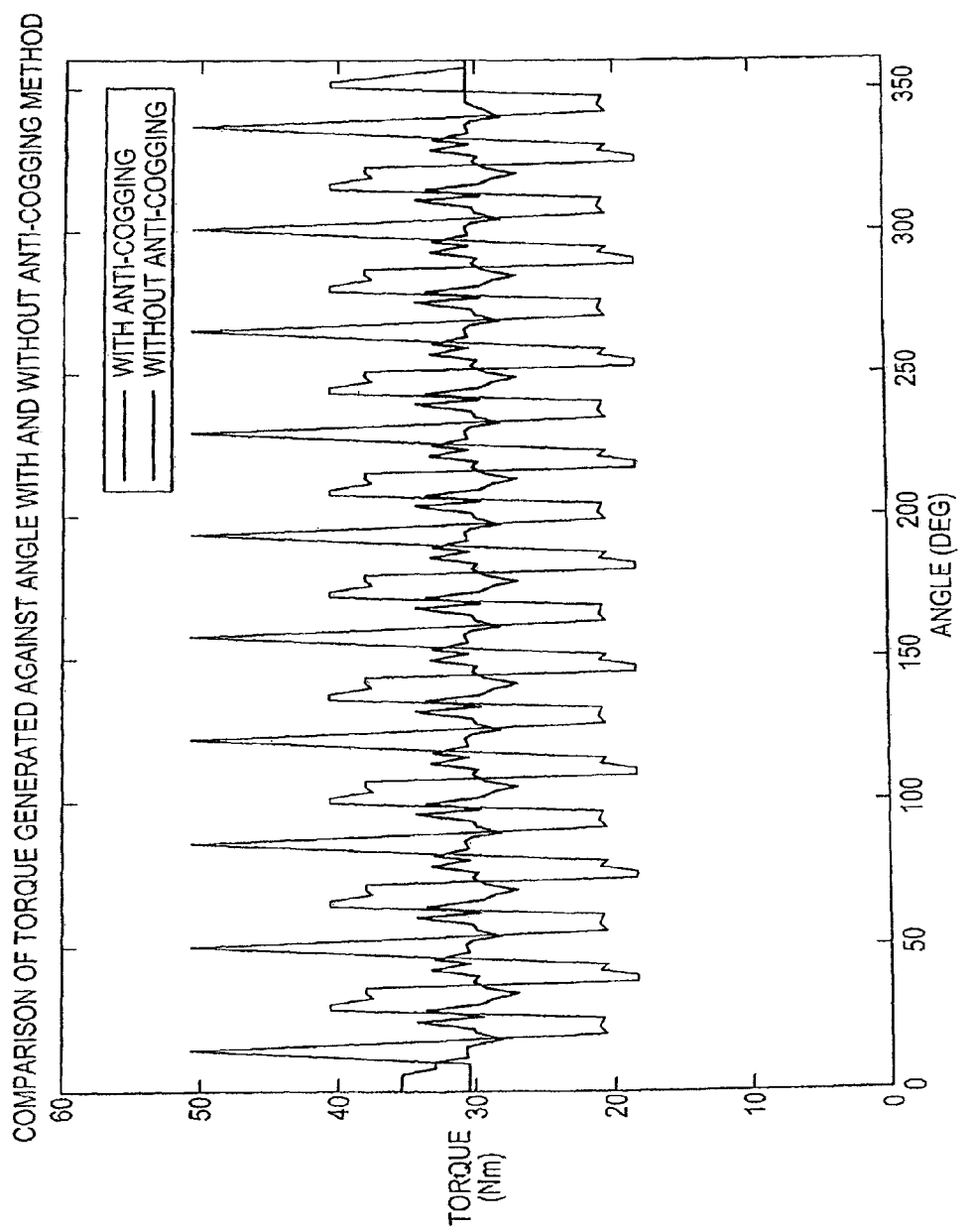

Embodiments of the invention will now be described with reference to the drawings, of which:

FIG. 1 is a representation of a known flywheel;
FIG. 2 is an isometric view of an embodiment of the present invention;
FIG. 3 is a cross-sectional view of the embodiment of FIG. 2;
FIG. 4 is a view of a shaft construction;
FIG. 5 is a detailed view of a winding pattern;
FIG. 6 is a view of the winding at a shaft;
FIG. 7 is a view showing alternative winding methods at a rim;
FIG. 8 is a cross-sectional view of a flywheel incorporating a warning ring;
FIG. 9 is a side view of the embodiment of FIG. 8;
FIG. 10 is a view of another embodiment incorporating a warning ring;
FIG. 11 is a side view of the embodiment of FIG. 10;
FIG. 12 is a view of a further embodiment having a warning ring;
FIG. 13 is a side view of the embodiment of FIG. 12;
FIG. 14 is a view of a yet further embodiment incorporating a warning ring;
FIG. 15 is a view of a flywheel constructed inside a vacuum chamber;
FIG. 16 is a cross sectional view of the flywheel of FIG. 15;
FIG. 17a is a view of a type of magnetic coupling;
FIG. 17b is a view of a magnetic coupling having a coupling element;
FIG. 18a is a view of an epicyclic magnetic gear coupling;
FIG. 18b is a close up view of part of the coupling of FIG. 18a;
FIGS. 19a to 19c are sequential views of part of the coupling of FIG. 18a as it rotates through a sequence of three positions;
FIG. 20 is a cross sectional view of a magnetic coupling such as that shown in FIG. 18a when incorporated in a vacuum chamber wall;
FIG. 21 is a view of a magnetic gear coupling incorporating staggered poles;
FIG. 22 is a view of an epicyclic magnetic gear coupling incorporating staggered poles;
FIG. 23 is a view of an epicyclic magnetic gear coupling incorporating a spread coupling element;
FIG. 24 is a view of a contra-rotating magnetic gear coupling incorporating staggered coupling elements and a spread coupling element;
FIG. 25 is a cross sectional view of a flywheel incorporating an epicyclic magnetic gear coupling;
FIG. 26 is a graph showing two curves of torque coupling capability versus gear meshing position.

DETAILED DESCRIPTION

In overview, the apparatus and method described herein relates to a flywheel energy storage device where material used in its construction is deployed in an inertially efficient manner, and where the support structure is under tension, a rim comprising a mass element is held in place on its outer surface by a winding which also passes around a drive transfer element, rather than for example by a compressive interference fit to its inner surface.

In other embodiments a support element can surround the rim to counteract centrifugal forces and a torsionally compliant or resilient drive transfer element such as shaft can be provided.

The winding may be configured in a number of ways as described below and may also be pre-tensioned. The drive transfer element may be a shaft, which may be hollow and may be constructed from wound carbon fibre. The rim may comprise a circumferential support member (also referred to as a support element) and a mass element mounted radially inwards of the support member.

In embodiments the rim may be constructed of a composite material, for example a wound carbon fibre and resin. The mass element may be a ring, pressed or moulded into the reinforcing element. Alternatively, the mass element may comprise one or more dense elements, which may be linked as in a chain, incorporated into the rim by moulding, drilling, pressing or adhesive attachment to the inside of the reinforcement element.

The drive transfer element may be a hollow shaft for example, and this may be formed from a wound carbon fibre composite. The composite may be wound with fibres oriented in directions arranged such that both bending of the shaft and twisting of the shaft result in a change in the length of the fibres, these deformations therefore being resisted by the fibre's natural tendency to resist changes in length. The shaft may thereby be formed so that it is compliant to a twisting motion.

A warning or indicator ring can be mounted to the flywheel rim, and the flywheel can be arranged such that at least one of the warning ring and other components move, expand, contract, deform or distort relative to the other under centrifugal force of sufficient magnitude. This can affect rotation of the assembly, for example by unbalancing it, which can be monitored or detected to provide an indication of overload.

Because a warning or indicator ring is incorporated with the flywheel to behave differently under rotation, when the flywheel reaches undesirable rotational speeds a detector can detect consequences of the different behaviour, for example, imbalance in the flywheel.

The indicator ring may be mounted to the flywheel with an interference fit, and is supported either by the support member or by the drive transfer element (for example, a shaft). The ring can be constructed from circumferentially wound fibre (for example, carbon fibre), or can be another material with sufficient strength in hoop to enable it to be rotated at the maximum designed flywheel speed without failing, and with a suitable stiffness as further described below. When mounted to the support member, the ring can be radially disposed inside or outside of the support member. When the ring is radially disposed inside of the support member, the ring has a stiffness which is greater than or substantially the same as that of the support member. When the ring is radially disposed outside of the support member, the ring has a stiffness which is lower than or substantially the same as that of the support member. The support member comprises circumferentially wound fibre, for example carbon fibre. When mounted to the drive transfer element (for example, a shaft), the ring has a stiffness which is lower than or substantially the same as that of the drive transfer element.

The interference fit results in a pre-load between the ring and its mounting (for example, the support member) when the flywheel is at rest. The level of preload and the relative stiffnesses of the ring and the ring mounting are chosen such that when the flywheel is rotated at or in excess of a predetermined trigger speed, the preload is substantially overcome by centrifugal forces, causing the ring and support member to separate. Generally, the less stiff component will tend to stretch and "grow" more than the stiffer component. Notably, however, in the case where the ring and its mounting have substantially the same stiffness, the two components will nevertheless tend to separate under rotation because greater forces act upon the component which is at the greater radius from the axis of rotation. The combination of radial position and material stiffness can be adjusted accordingly to achieve separation at the desired predetermined speed. The predetermined speed is chosen to be lower than the speed at which flywheel failure is to be expected. The ring is fitted to its mounting by a press fit which results in a non-uniform stress distribution at the interference boundary.

Referring to FIGS. 2 and 7, in order to effectively provide a high inertia, a rim (50) including a mass element (10) comprising, for example, a ring of relatively massive material is disposed at a relatively large radius, compared with the size of the flywheel (30), from a drive transfer element such as a shaft (60) providing a central rotating axis (20). The mass element (10) has a high density in order to effectively provide inertia. Suitable materials may be lead or steel for example, although other materials could be used. The mass element (10) is subject to stress when the flywheel (30) is in rotation, this being induced by centrifugal forces.

An outer circumferential support member (40) is located radially outside the mass element. The support member (40) has a high hoop strength and is able to counteract the centrifugal forces acting on the mass element (10) when the flywheel (30) is in rotation. The support member (40) is preferably a carbon fibre composite, wound in a circumferential direction so as to impart a high strength in hoop. In the embodiment shown the support member (40) is pressed onto the mass element (10) with a small interference preload such that the two are effectively joined, forming a rim (50). The preload only needs to be small since it merely functions to hold the two elements together in an interference fit when the flywheel is stationary. Alternatively, the two may be joined by an adhesive bond or similar. The more efficient placement of mass, concentrating mass near the rim of the flywheel results in a lighter flywheel for a given energy storage capacity. Although the mass element is shown in FIG. 2 as a continuous ring, alternatively it may be separate ring segments, or may be discrete elements of mass. For example, an alternative arrangement is shown in FIG. 7 wherein the mass may be inserted or moulded into the support member (40), either as a ring, or as discrete elements into receiving holes in the support member (40).

Referring to FIGS. 2, 5 and 6, a winding couples the rim (50) to the shaft (60). The winding is configured such that it consists of substantially or partially radial portions (80) extending from the shaft (60) to the rim (50) and substantially axial portions (90) extending around the rim (50). In the embodiment shown the winding is filament wound in a winding operation proceeding as follows: radial portions from shaft (60) to rim (50), axial portions over the rim (50) so as to form a 'sling', and then radial portions back from rim (50) to shaft (60), in a repeating fashion. The winding (87) may pass at least partially around the circumference of the shaft (60) between some but not necessarily all iterations of the winding operation. The winding (80, 90) will stretch slightly as the rim (50) grows under centrifugal forces and will exert a counter-acting force on the rim (50). Thereby, the winding (80, 90) assists the support member (40) of the rim (50) in resisting the centrifugal forces acting on the mass element (10) and in resisting the radial growth of the rim (50). The winding (80, 90) could be made of a fibre, including carbon, glass fibre, Kevlar, Zylon or nylon, or could be made of a metal wire in low stress applications. As a result more massive mounting arrangements such as a central support section or spokes are not required.

In embodiments where the mass element comprises a ductile or malleable material, the support member (10) and the winding (80, 90) can be pre-tensioned during manufacture by the following method: The flywheel is assembled in the way herein previously described, with drive transfer element (60) and rim (50) coupled by a winding, the rim (50) comprising a mass element (10) and an outer support member (40). No or negligible pre-load inwardly need be applied at this stage. The flywheel is then spun at an angular velocity sufficiently high that the centrifugal forces on the mass element (10) are sufficient to cause it to yield and smaller than its ultimate tensile strength. As a result, the mass element (10) yields outwardly and its circumference increases. The increase in circumference of the mass element (10) results in a secure interference fit between mass element (10) and support member (40), thereby stretching and pre-tensioning the support member (40) and also stretching and pre-tensioning the winding (80, 90). The mass element (10) has a low to moderate Young's modulus, which is less than that of the support member (40), such that the mass element's (10) tendency to deform under centrifugal forces is greater than that of the support member (40). This operation results in a pre-tensioning of both the support member (40) and the winding (80, 90). In this way, both the support member (40) and the winding (80, 90) are pre-tensioned, compared to the result of fitting the mass element (10) to the support member (40) with an interference fit before adding the winding, which would result in a pre-loading of the support member (40) only. In other embodiments the above method can be used to pre-tension the support member alone.

In other embodiments, a material with an extremely low Youngs's modulus comprises the mass element (10), such as Lead. The use of a dense liquid such as Mercury results in a flywheel in which the mass element (10) is self-balancing. The support member (40) constrains the mass element (10) radially inside the support member (40).

Suitably ductile or malleable materials for use in comprising the mass element (10) have a large ultimate tensile strength compared with their first point of yield strength, defining a sufficiently large ductile region that the yield point of the material can be exceeded during the manufacturing operation detailed above without a risk of exceeding the ultimate tensile strength of the material. A suitable ratio of yield strength to ultimate tensile strength would be close to 1:2. The material used for the mass element (10) also has a first point of yield which is sufficiently low that it may be exceeded at moderate flywheel speeds such that failure of other parts of the flywheel is avoided, such parts being for instance the outer support member (40) and winding (80, 90). The material also has properties such that the centrifugal forces resulting in the pre-loading process cause a sufficiently large circumferential deformation of the mass element (10) that the resulting deformation of the support member (40) and winding (80, 90) results in a pre-load which significantly counteracts centrifugal forces acting on the mass element (10) when it is rotating at the typical rotational speeds encountered during normal operation.

In embodiments where the mass element (10) is not ductile and is not pre-loaded using the above method, the ultimate tensile strength of the mass element is optimally close to that of the support member (40) and the yield strength of the mass element (10) is as close as possible to the ultimate tensile strength of the support member (40).

Referring to FIG. 5, the angle of the winding portions (80) from shaft (60) to rim (50) may be selected to determine the characteristics of torque transfer between shaft (60) and rim (50). The angle used may be selected between i) a tangent to the shaft circumference and ii) perpendicular to the shaft circumference. A selected angle which is close to a perpendicular angle to the shaft (60) will enhance the contribution made by the winding (80) to the counteraction of centrifugal forces acting on the mass element (40). A selected angle which is close to a tangent to the shaft circumference will enhance the ability of the winding (80) to transfer torque between the rim (50) and the shaft (60). A compromise angle within the range of angles above can be selected in order to optimise the contribution made by the winding. Since the winding (80, 90) is only able to transfer torque when in tension, the radial winding portions (80) can be arranged in both clockwise (85) and anticlockwise (86) directions such that either clockwise (85) or anticlockwise (86) winding portions are in tension, depending on whether the flywheel is accelerating or decelerating. Yet further the axial position along the shaft about which the winding is arranged can be varied to vary the strength of tensile support.

Referring to FIG. 2, the number of turns of the winding (80, 90), and as a result its strength, may be varied. Likewise, the number of turns of fibre in the carbon support member (40) may be varied so as to alter its strength. Since the reaction against the centrifugal forces acting on the mass element (10) is a combined reaction from the support member (40) and the winding (80, 90), the relative contribution from each can be varied by altering the number of turns in the winding (80, 90) and the number of turns in the support member (40). In one aspect, the support member (40) can be removed altogether, the centrifugal forces acting on the mass element being counteracted solely by the winding (80, 90). Yet further the winding can extend continuously around the whole circumference or can be interrupted with gaps in the circumferential direction between individual or groups of fibres, providing a "spoke-like" arrangement. For example, in the case where the mass element is a number of discrete elements the winding at the rim (90) can be aligned with the discrete mass elements.

Referring to FIG. 3, the rim (50) is at least temporarily supported by a carrier portion (70) on the drive transfer element, which may be a shaft (60). The carrier portion is preferably made of a lightweight material so as to reduce overall flywheel mass and concentrate mass at the periphery. The carrier portion may for example be made of wood, wax, resin or other lightweight material. The carrier portion allows mounting of the rim on the drive transfer element while the winding is being applied during manufacture. The carrier portion may be removed or removable after the winding has been applied to the rim and drive transfer elements, by way of erosion, dissolution, melting or sublimation.

The winding and the carrier portion are relatively light compared with the rim, thereby the flywheel may thus be configured with a rim comprising a mass element such that the majority of the mass of the flywheel is near the rim where it is most inertially efficient. The carrier portion (70) may be glued to the shaft (60) and/or the rim (50).

Referring to FIG. 4, the shaft (60) may be solid, but is preferably hollow so as to reduce its mass. The shaft (60) is preferably a carbon fibre composite, woven such that it is torsionally compliant and axially stiff. The shaft could however be made of other materials such as glass fibre, steel, titanium, other metals or composites. In the case of a fibre composite shaft, the weave pattern of the fibres may be altered so as to influence the degree of resistance to bending and twisting, and to fine tune the torsional compliance of the shaft. The shaft may have one or more bearing surfaces (65) pressed or glued onto it. One or more bearing surfaces (65) may also incorporate a drive coupling (66), or a separate drive coupling may be glued or pressed onto the shaft. The torsional compliance of the shaft has the effect of limiting peak torque levels at the drive coupling and therefore allows the use of drive couplings with lower peak torque handling capability than that of splined drive couplings, for example frictional or magnetic couplings.

Manufacture of the flywheel can be further understood by referring to FIGS. 3 and 6. The winding (80, 90) can be formed by a 'wet winding' process whereby a binder is provided for example using a resin or adhesive. The fibre which forms the winding (80, 90) can be impregnated with a resin or adhesive and can be wound while the resin or adhesive was still 'wet', that is to say that the resin or adhesive is in the uncured state. Alternatively, the support member (40) can be coated with a resin or adhesive before or during the process of forming the winding (80, 90) such that the winding (80, 90) adheres to the support member (40). Likewise, the shaft (60) can be coated with a resin or adhesive prior to or during the winding process such that the winding (80, 90) adheres to the shaft (60). These techniques enhance the transfer of torque between shaft (60) and rim (50). Alternatively, an interference fit between winding (80, 90), shaft (60) and rim (50) could be used.

Referring to FIG. 7, the winding (80, 90) and the support element (40) have henceforth been described as separate wound elements. However, it would be possible to combine both elements by, for instance, interleaving turns of the winding (80, 90) and turns of the support element (40). It would also be possible to first form the support element (40), form holes (45) through it, and then form the winding (80, 90) with the winding portions (80, 90) passing through the holes (45) in the support element (40). The shape of the support element (40) may be hemispherical or parabolic in order to spread stress in the portion of the winding (90) which contacts the support element (40). Any smooth sectional outline shape is envisaged as being suitable.

Referring to FIGS. 2 and 5, spaces may be left between the winding portions at the rim (80, 90) such that access to the carrier portion (70) remains. The carrier portion (70) may be left in place or may be removed by blasting, erosion, dissolution, melting or sublimation, after the winding (80, 90) has been formed. The carrier portion could for example be made of ceramic, resin, wax or other suitable material to enable this operation. Removing the carrier portion (70) would result in an even lighter flywheel having an even lower proportion of inertially inefficient mass. With the carrier portion removed, the winding provides the only substantial means of support for the rim on the drive transfer element.

In alternative approaches the flywheel can be constructed with the circumferential support member providing hoop strength but the ring being mounted using a conventional central support section rather than a winding.

In use the flywheel may be mounted in a vehicle or any other appropriate setting for storage of energy or other purpose such as stabilisation and coupled or decoupled from a drive-providing or receiving component such as a motor, engine or dynamo as appropriate via the drive transfer element.

Referring to FIGS. 8 and 9, which show a first embodiment of a flywheel (30) having a warning or indicator ring (800), it can be seen that the warning ring (800) is mounted on the outer periphery of the support element (40). The warning ring (800) is mounted radially outside the support element (40), using an interference fit, and is typically pressed into place. The interference fit between the warning ring (800) and the support element (40) results in a pre-load force between these two components when the flywheel (30) is at rest. The assembly of warning ring (800) to support element (40) results in a residual non-uniform stress between the two. The winding (80) passes around the warning ring (800), support element (40) and mass element (10). The flywheel is finely balanced to avoid vibration when rotating. During manufacture, the balancing operation is performed after the warning ring is assembled such that it is balanced with the warning ring in place.

As shown in FIGS. 8 and 9, the winding (80) passes around the warning ring (800) and support element (40) Thus, the winding tends to hold the warning ring (800) in contact with the support element (40), counteracting the warning ring's tendency to grow away from the support element (40). However, by selecting the stiffnesses of the warning ring (800), winding (80) and support element (40) appropriately it is possible to ensure that the warning ring (800) is able to move radially (i.e. grow) away from the support element (40) under centrifugal forces. In other embodiments (such as shown in FIGS. 10 and 11) the warning ring (800) is pressed onto the outside of the support element (40) and radially outside the winding (80).

In the embodiments shown in FIGS. 8 to 11, the warning ring (800) has a lower Young's modulus (is less stiff) than the support element (40) such that in operation when the flywheel is rotated, the warning ring (800) grows radially (under centrifugal forces) a greater amount than the support element (40) grows, leading to separation when the centrifugal force reaches a sufficient magnitude. In the embodiments shown in FIGS. 8 and 9 where the winding passes around the warning ring (800), the stiffness of winding (80) and warning ring (800) are together low enough such that the warning ring (800) and winding (80) grow more than the support element (40) grows when the flywheel is rotated. The warning ring (800) need only be a lightweight ring with relatively low strength compared to the support element (40), since the warning ring (800) does not substantially support the mass element (10).

Expansion of the warning ring leads to a relaxing of the pre-load between the warning ring (800) and the support element (40). At a trigger rotational speed or centrifugal force magnitude (predetermined by the amount of interference fit pre-load, and the relative stiffnesses of the warning ring and the support element), the pre-load is overcome and the warning ring (800) and support element (40) at least partially separate. The separation is likely to occur non-uniformly for example, because the interference fit has a non-uniform stress distribution at the interference boundary, leading to a movement off-centre and an imbalance in the rotating mass. Furthermore, the residual non-uniform stresses between the warning ring (800) and the support element (40) are at least partially released by the movement of the warning ring (800) with respect to the support element (40). This movement causes the flywheel (which is finely balanced during manufacture) to go at least slightly out of balance. The imbalance cause by relaxation of the residual stresses is permanent (that is, the imbalance is permanent unless the flywheel is subsequently at least partially re-manufactured, for example by at least performing the step of re-balancing the flywheel and optionally, prior to rebalancing, performing the steps of removing and re-mounting the warning ring onto the support element such that the residual non-uniform stress is restored, thereby restoring the capacity of the flywheel to go out of balance if the pre-load is again overcome) and can be considered to be evidence of a mechanical "fuse" having been triggered.

The resulting imbalance causes a vibration when the flywheel is rotating and the vibration can be detected by a vibration sensor so as to give an indication of excessive flywheel speed, the indication being separate from any indication derived from, for example, a flywheel speed sensor. An example of a suitable vibration sensor is a piezo-electric accelerometer. Thus, even if the main flywheel speed sensor malfunctions, a separate and independent indication of excessive flywheel speed is provided. Furthermore, a permanent indication results showing that the flywheel has at some point been operated above its design speed and thus might fail at some point in the future.

In the second embodiment shown in FIGS. 10 and 11 the warning ring passes outside the winding (80) and its relative stiffness is selected accordingly to provide the same effects.

In a further embodiment, as shown in FIGS. 12 and 13, the warning ring (800) is mounted with an interference fit, radially inside the support element (40). The mass element (10) is interposed between the support element (40) and the warning ring (800) in this embodiment, but in other embodiments can be incorporated in the support element (40) as previously described or the warning ring can be interposed between the mass element (10) and support element (40). In these further embodiments the warning ring (800) has a higher Young's modulus (is stiffer) than the support element (40).

In operation when the flywheel is rotated, the support element (40) grows radially (under centrifugal forces) a greater amount than the warning ring (800) grows. Similarly to the previous embodiments, the pre-load between the warning ring (800) and support element (40) is overcome by centrifugal forces, allowing the warning ring (800) to move. When the support element (40) grows radially such that the space within it is larger than the outside diameter of the warning ring (800), the warning ring (800) is able to move off-centre within the support element (40), leading to an imbalance. Furthermore, under influence of the non-uniform residual stresses (residual from the press-fitting assembly operation during manufacture whereby the warning ring is pressed into the centre of the support element), the warning ring (800) is caused to move within the support element when the pre-load is overcome by centrifugal forces, thereby causing the flywheel to go permanently out of balance, causing vibration. As previously described, vibration can be detected by a sensor and used as a warning indication.

In a yet further embodiment, the warning ring (800) is press-fitted to the drive transfer element (which is, for example, a shaft) with an interference fit which results in a pre-load. As before, the flywheel is finely balanced. The warning ring (800) is less stiff than the shaft (60) and grows radially more than the shaft grows when the flywheel rotates. At a predetermined speed, the pre-load is overcome, allowing the warning ring (800) to move on the shaft which causes an imbalance which can be detected prior to mechanical failure.

The deliberate production of an imbalance when a flywheel speed exceeds a trigger speed, and detection of a vibration caused thereby, as described above, provides a warning that the flywheel is being operated or has been operated at above its maximum safe operating speed. This warning can be determined separately from a primary flywheel speed monitoring system and thus provides a fail-safe second indication of excessive flywheel speed in the event that the primary speed monitoring system fails. It will be noted that detection of overload can be triggered by setting at the detector the level of imbalance signifying overload, or by modifying the relative properties of the warning ring and/or other rim components, or any combination thereof. The system can be calibrated to indicate excessive speed when all or part of the warning ring detaches, or when relative movement/dimension change is sufficient to create a detectable or threshold-surpassing imbalance.

The embodiments where the warning ring (800) is enclosed by the winding (80) have the advantage that should the flywheel be operated at a speed higher than the trigger speed, with the result that the warning ring becomes loosened from the support element (40), the warning ring (800) is contained within the winding (80) and there is no danger of the warning ring (800) becoming completely detached.

It will be seen that, as a result of the configuration described above, a stronger, safer and more efficient flywheel can be provided.

A method of balancing such a flywheel will now be described. Referring to FIG. 15, a flywheel (30) can be placed inside a vacuum chamber (1550). Operating a flywheel in a vacuum is advantageous since it reduces frictional losses/overheating associated with our resistance (or "windage"). The flywheel rim (50) inevitably has surface irregularities (1630) which result from inadequacies in the balancing operation which is performed on the flywheel during its manufacture, and/or the methods used to construct the flywheel. It has been found, as previously mentioned that these irregularities result in an imperfect rotational balance of the flywheel (30).

In the embodiment shown, the flywheel is supported in the vacuum chamber (1550) by bearings such that the flywheel is able to rotate inside the vacuum chamber. The vacuum chamber is a sealed chamber capable of withstanding forces exerted by a pressure difference between atmospheric pressure and the pressure inside the vacuum chamber. The thickness of the vacuum chamber wall is made sufficient to give it enough strength to support atmospheric pressure against the vacuum inside the chamber. The vacuum chamber incorporates at least one of a gas inlet (1520) and a gas outlet (1510). Optionally the gas inlet and gas outlet are combined as a single port. Each of the gas inlet and gas outlets communicate with the interior of the vacuum chamber.

A coupling (1566, 1567) is comprised of first and second members and is arranged to couple torque between a rotatable driveshaft (1570) and the flywheel shaft (60). A first member (1566) is coupled to the flywheel shaft (60), and a second member (1567) is coupled to the drive shaft (1570). The flywheel shaft (60) is supported on bearings and is connected to the flywheel rim (50) by means such as already described. The flywheel rim (50) is comprised of a composite material which is preferably finely balanced by machining, drilling, or grinding during manufacture. The flywheel rim (50) in this embodiment is a composite constructed using a circumferentially wound fibre and resin as previously described. The rim is coupled to the shaft (60) by radial fibres such that torque can be transmitted from the flywheel shaft (60) to the flywheel rim (50).

The driveshaft (1570) is supported by bearings outside of the vacuum chamber and is rotatable. The flywheel shaft (60) and the driveshaft (1570) are supported such that the two coupling members (1566, 1567) are arranged in close proximity with the wall of the vacuum housing (1550) arranged therebetween. The members are arranged so as to minimise the "air gap" between the coupling members (1566, 1567) and the vacuum chamber wall (1550). The term "air gap" is used to describe in general the total gap between the two members of the coupling (1566, 1567). The vacuum chamber can be constructed in any commonly known manner, e.g. casting, machining etc.

Referring to FIG. 16, a valve (1610, 1620) is incorporated in or attached to the inlet port (1520a) and the outlet port (1510a) of the vacuum chamber (1551). In operation, the valves can be opened or closed so as to selectively seal the inside of the vacuum chamber (1550) from the atmosphere, or allow communication between the interior of the vacuum chamber (1551) and the atmosphere. The outlet port can be Connected in use to a vacuum pump (not shown).

In use, the vacuum chamber is sealed from the atmosphere by closing the inlet valve (1620) so as to isolate the inlet port (1520a) which is at atmospheric pressure from the interior of the vacuum chamber (1551). The outlet valve is typically connected to a vacuum pump capable of producing a high, or hard, vacuum. The outlet valve (1610) is opened so as to allow the outlet port (1510a) which is connected to the vacuum pump to communicate with the interior of the vacuum chamber (1551). The vacuum pump is then run until the vacuum chamber (1551) contains a hard vacuum. Preferably, this vacuum is better than 1 mbar, typically $10^{-2}$ mbar. The flywheel (30) is then rotated by the application of torque from the driveshaft (1570) via the coupling (1566, 1567) to the flywheel shaft (60). This in turn rotates the flywheel rim (50). The flywheel is rotated at a speed such that the rim (50) surface is travelling at a speed which is in excess of the speed of sound (Mach 1). The flywheel surface speed is also referred to as the "tip speed". Prior to this operation, as previously stated, the flywheel will have been balanced by mechanical operations such as grinding, drilling, or machining, to as high a degree as practical (within cost constraints) or at least as high as necessary to enable the flywheel to be rotated at such a speed without danger of mechanical failure.

Next, while the flywheel is rotating at a perimeter speed of at least Mach 1, the inlet valve (1620) is opened so as to allow an amount of gas to enter the vacuum chamber. This gas is preferably a non-reactive gas such as nitrogen, and is preferably a dry gas, that is it does not contain significant amounts of water vapour, so as to avoid introducing humidity into the assembly. If the gas is to be anything other than plain air, the inlet port would first need to be connected to a suitable supply of said gas. The amount of gas admitted is sufficient so as to substantially reduce the vacuum to a pressure substantially higher than $10^{-1}$ mbar, for example as high as 0.5 bar. I bar works well. The rate of gas entry has been found to be non-critical.

Upon admission of the gas into the vacuum chamber (1551), shock waves are set up in the gas between the surface irregularities (1630) and the wall of the vacuum chamber (1551). The shockwaves, and also friction between the surface irregularities (1630) and the gas, act to vapourise, melt, sublimate, erode or abrade the surface irregularities (1630) so as to reduce their size and thereby improve the balance of the flywheel (30) to a higher degree of balance then that obtainable by mechanical machining, drilling, or grinding alone.

Furthermore, a flywheel is normally designed for a maximum safe operating speed. During manufacture, such a flywheel must be proved to withstand the maximum rotational speed it is designed for. This is typically done by rotating the flywheel at a speed equal to the square root of 2 multiplied by the design speed. Especially in composite flywheel construction types, it can be safely assured that if the flywheel survives rotation at this higher speed then it will always survive operation at the design speed for its lifetime duration. It is further advantageous to combine this proving operation with the balancing operation described above.

The rate of gas admission has not been found to be critical. After gas admission, the flywheel is allowed to slow to rest, but continues to rotate at a tip speed of at least Mach 1 for around 10 to 60 seconds, typically 15 seconds. This has been found to be long enough to remove the surface irregularities while avoiding overheating the flywheel rim. The time taken for the flywheel to come to rest was in one embodiment approximately 3 minutes. The gas density is not homogenised throughout the vacuum chamber. A non-reactive gas is preferred so as to avoid reaction of the gas with the flywheel components. When the flywheel is rotated at a tip speed in excess of Mach 1, the supersonic shock wave produced causes a far better balancing effect than if subsonic flywheel speeds are used.

In embodiments it is desirable to use magnetic coupling for example to avoid the need for rotating seals isolating a vacuum. FIG. 17*a*, shows a prior art magnetic coupling for coupling two rotatable shafts (60, 1570). Each shaft is coupled to a coupling member (1766, 1767) comprising an array of alternating magnetic poles. The two arrays are arranged close to each other, such that magnetic flux can pass from one to the other via an air gap (which is preferably as small as possible). Torque can thus be usefully transferred from one shaft to the other.

This can be particularly useful in a flywheel application since the two coupling elements (1766, 1767) are not required to touch in order to transmit torque therebetween. The wall of a vacuum chamber (1550) can be placed between the coupling elements (1766, 1767), thereby allowing torque to be coupled between a flywheel (30) inside a vacuum chamber (1550) and a driveshaft (1570) outside of the vacuum chamber. This allows the vacuum chamber to be sealed without the use of rotating seals, as described above. Running a flywheel in a vacuum is useful since it avoids air resistance ("windage") related losses. Thus becomes even more important if the flywheel runs at supersonic speeds. The vacuum avoids supersonic shockwaves and/or overheating due to friction with air. However, since the vacuum chamber wall thickness forms part of the air gap between the coupling elements (1766, 1767), the ease with which magnetic flux is able to pass from one coupling element to the other is reduced, therefore the flux density is reduced, and the torque coupling capability is resultingly reduced. The following embodiments solve this problem.

Referring to FIG. 17*b*, a coupling element (1730) is placed between the coupling elements (1768, 1769). The magnetic coupling element (1730) has a high relative magnetic permeability (in excess of 400) and therefore in operation magnetic flux passes easily through it, from the poles (1711, 1721) of the first member (1768) to the poles (1741, 1751) of the second member (1769) and vice versa. The coupling element is effectively "transparent" to the magnetic field. The coupling element (1730) is of a material having a high magnetic permeability, for example soft iron. The coupling element (1730) should also have as high as possible electrical resistance, so as to reduce induced eddy currents and the losses due to resistive heating associated therewith. Although a single coupling element (1730) is shown for clarity, several coupling elements are arranged between the first and second members (1768, 1769). Sufficient coupling members are present, so as to span at least two north-south poles pairs of the member (1768, 1769) having the widest spaced apart poles (1711, 1721, 1741, 1751). The space between coupling elements has a much lower magnetic permeability than the coupling elements, an example material is plastic. When arranged thus, in use, magnetic flux is coupled via each coupling element (1730) from the poles of each member (1768, 1769) and thereby torque is coupled between the first and second members (1768, 1769). Notably, in use, contrary to FIG. 17*a* in which the first and second members contra rotate, the members of FIG. 17*b* rotate in the same direction. The surfaces of the first and second members of FIG. 17*b* actually pass in opposite directions relative to each other.

When the coupling of FIG. 17*b* is incorporated in a vacuum enclosed flywheel application, the coupling elements (1730) are incorporated in the vacuum chamber (1551) wall. This has the advantage that the vacuum chamber wall thickness does not contribute to the total "air gap" between the poles of the first and second members (1768, 1769). The total "air gap" is made up of the gap between the surface of the first member poles and the surface of the vacuum chamber wall, plus the vacuum chamber wall thickness, plus the gap between the vacuum chamber wall and the second member poles, minus the thickness of the coupling element. Thus, the coupling element significantly reduces the total air gap. A smaller air gap presents less resistance to magnetic flux, thereby allowing a greater flux density between the poles of the first and second members in use, and therefore a greater torque coupling capability. This is highly advantageous over conventional arrangements using magnetic couplings through a vacuum chamber wall.

The magnetic poles (1711, 1721, 1741, 1751) are rare earth magnets, since these exhibit high field densities for a given volume of magnetic material. The magnets are smaller lighter, more compact, and able to transmit greater torque. Rare earth magnets have also been found to be good at withstanding compressive forces and are therefore suitable for placing on the inner circumference of a flywheel which rotates at high speed.

Referring now to FIG. 18*a*, a concentric embodiment of the magnetic coupling shown in FIG. 17*b* is illustrated. FIG. 18*a* is a cross-sectional view showing the first member (1770) concentrically outside the second member (1780), and the vacuum housing (1550) concentrically therebetween. Incorporated in the vacuum housing (1552) are the coupling elements (1731). In this concentric embodiment, the first and second members contra-rotate. In common with the embodiment in FIG. 17*b*, the surfaces of the members move in opposite directions relative to each other.

The number of coupling elements required, for an evenly spaced distribution around the circumference of the vacuum housing between the first and second members, is equal to the number of north/south pole pairs of the first member (1770) added to the number of north/south pole pairs of the second member (1780). The coupling elements can be confined to particular regions around the circumference of the vacuum housing, or can be distributed evenly around its circumference. In the case where the coupling elements are confined to particular regions, the coupling elements (1731) are spaced with respect to each other as if the full number of coupling elements were equally spaced around the vacuum chamber wall, except that some elements are omitted. The positioning is ideally chosen such that coupling elements are positioned symmetrically around the vacuum chamber wall circumference, so as to avoid net forces resulting. A minimum number of coupling elements required is that which will span two pairs of north/south pole pairs of whichever of the first and second members have the greater pole spacing. This minimum number guarantees that torque can be transferred between the members and that the relative directions of rotation of the first and second member is well defined.

Backing iron (1890) is arranged on the side of the poles facing away from the coupling elements so as to aid the transmission of magnetic flux between the mutual pole pairs of each one of the first and second members. Further, the backing iron aids the longevity of the permanent magnets.

Such a concentric magnetic geared coupling can be constructed using standard machining techniques and using the materials as described for the embodiment shown in FIG. 17b.

The first and second members (1770, 1780) can have the same number of north/south pole pairs, or can have a different number of north/south pairs. In the shown embodiment, the second member has a lower number of north/south pole pairs than the first member. In operation, when the first member (1770), having a number of north/south pole pairs m, is rotated in a anticlockwise direction, the second member (1780), having a number of north/south pole pairs n, rotates in a clockwise direction. The second member rotates at a speed relative to the rotational speed of the first member multiplied by a factor: n divided by m. FIG. 18b shows the lines of magnetic flux (1880) which pass between the poles of the first and second members, via the coupling elements (1730) which are embedded in the vacuum chamber wall (1552).

FIGS. 19a to 19c show a sequence of a rotation of the first and second members through three positions. FIG. 19a shows the lines of flux between the poles of the first and second members in a first position. FIG. 19b shows the top member having rotated slightly in a clockwise direction, and the bottom member having rotated slightly in an anti clockwise direction. The lines of flux have accordingly moved position, and in particular a line of flux (1880) has stretched. FIG. 19c shows a further rotation of the top member in a clockwise direction and of the lower member in an anti clockwise direction. The line of flux (1880) has now stretched so far that it has broken and flux has switched to pass instead via the left most coupling element (1895) to form a new line of flux (1890). The torque transferred from the first member to the second member is equal to the rate of change of flux as the lines of flux switch from one route to another route in this way.

A further advantage from the use of rare earth magnets results from their high flux density per unit size, particularly when used in this way, since it is possible to arrange a large number of pole pairs around the circumference of the first and/or second members and thereby increase the rate of change of flux and thereby increase the torque coupling capability.

Also, due to the relatively small size of rare earth magnets for a given strength, it possible to have a large ratio between the number of pole pairs on the first member and the number of pole pairs on the second member, since many magnets can be packed into a small size thereby delivering a high gear ratio in a compact size. This has the advantage particularly in flywheel applications employing a vacuum chamber (1550) in that the driveshaft and associated components which run in air are able to be run at a lower speed, thereby reducing losses associated with windage and air resistance, while the flywheel inside the vacuum chamber (1550) is geared by the magnetic coupling to run at a higher speed, so as to increase the energy storage density of the flywheel.

Existing systems employ a gear box to allow the flywheel inside the vacuum chamber to rotate at a high speed while the drive shaft to the energy source/sync is able to rotate in air at a slow angular velocity. However, gear boxes suffer frictional losses and increase the cost, complexity and size of the energy storage system.

FIG. 20 shows an embodiment of a flywheel (30) having a rim (containing the majority of the mass) (50), mounted on a shaft (60), coupled to a first element (1771) and housed within a vacuum chamber (1553), the vacuum chamber incorporating coupling elements (1732). In this embodiment, the drive shaft (1570) is coupled to the second element (1781). The driveshaft and the flywheel shaft are supported on bearings (2010). Each of the first and second members (1771, 1781) has poles (1713, 1723, 1743, 1753). Thus, the flywheel can be driven in a vacuum at high speed by the driveshaft which is coupled to the flywheel via the first and second members and the magnetic poles. Due to the gearing effect brought about by the unequal numbers of pole pairs on the first and second members, the drive shaft, which runs in air, is able to run at a lower speed thereby reducing "windage", or air resistance related losses.

Furthermore, the coupling elements (1732) reduce the air gap between the magnetic poles and enable permanent magnets to be used to couple a high level of torque between the first and second elements, avoiding the need for an energy conversion, as would be required for example if electromagnets were used. By using the coupling elements (1732) electromagnets are not required since the more efficient arrangement allows the more limited field strength of permanent magnets to be sufficient.

According to the approach described, the use of rotating seals is completely eliminated, thereby eliminating the need for environmental management apparatus to maintain the vacuum inside the vacuum chamber (1553). The vacuum inside the vacuum chamber can remain there indefinitely since the chamber is completely sealed, using no rotating seals which can leak. The removal of the associated environmental management equipment (for example a vacuum pump, lubrication pump, associated pipe work and systems, control systems/electronics) further reduces the flywheel storage system weight and size and increases the energy storage density. Furthermore, reliability of this simpler system is accordingly improved and cost is reduced. Thereby a highly efficient flywheel energy storage device is provided.

The coupling also has the advantage that if an over-torque condition occurs, the coupling harmlessly slips while the over-torque condition exists, and then later resumes normal function with no adverse effects. Furthermore, due to Earnshaw's Law, only torsional energy is transferred via the coupling, therefore the coupling gives axial and radial isolation in respect of vibration. In an alternative embodiment, the coupling elements could be supported in a third member which is driven by a shaft or could drive a shaft, so as to provide further gearing ratios.

The removal of rotating seals also allows the flywheel to rotate at a faster speed than would otherwise be possible due to degradation rates of the seals (which become worse as rotation speed increases), further increasing the energy storage density. Parasitic losses due to shear in the seal lubrication fluid (which is a necessary feature of rotating seals) will also be reduced by removal of the seals.

As previously discussed, and referring to FIG. 17b, magnetic gears can exhibit a variable torque coupling capability with rotational meshing position of the first and second members (1766, 1767). This has been found to be a result of magnetic flux (as shown in FIG. 19c) switching from a first path (1880) to a second path (1890) as the first and second members (1766, 1767) move past each other. A further cause of variation in the torque coupling capability of a magnetic gear coupling is due to the varying magnetic flux path lengths (shown in the sequence of FIGS. 19a to 19c) as the first and second members (1766, 1767) move past each other. A longer magnetic flux path experiences greater magnetic reluctance, thereby reducing magnetic flux density and, as the torque is proportional to the rate of change of flux, reducing the torque coupling capability of the magnetic gear at that angular meshing position is likewise reduced.

Following now to FIG. 26, the variation of torque coupling capability for a particular physical implementation with respect to the angle of an input shaft can be seen as the curve which exhibits large exclusions of torque coupling capability (between approximately 20 Nm and 50 Nm).

It has been found that variation of torque coupling capability with meshing angle (or "cogging") can be reduced by splitting each magnetic pole of a member, into "split parts" (2110, 2111, 2112, 2113, 2120, 2121, 2122, 2123). The split parts are arranged in the direction of motion so as to form split arrays. The split arrays are arranged side by side along an axis orthogonal to the direction of motion, as shown in FIG. 21. Each split array is offset in the direction of motion with respect to another split array, such that a spread of relative positions is covered. The spread of positions should cover approximately at least the distance of a north-south pole pair of the member having the widest pole spacing. Since the relative positions of the split arrays are spread (or "staggered") over a range of positions, it is not possible for a pole of each of the split arrays to each simultaneously align completely with a coupling element and with a pole of the other member, thus "complete alignment" is prevented. Thereby, by splitting and staggering poles of one or both members, and/or by splitting the coupling element and staggering the positions of each split coupling element part, complete alignment of the members and/or the couple elements can be prevented.

In the embodiment shown in FIG. 21 which has first and second members 1772 and 1782 (with the second member having poles 1744), there are four split arrays on the first member (1766). The result of this arrangement, which prevents complete alignment, is that, referring back to FIGS. 19a to 19c, the position (an angular position in this embodiment) at which flux lines (1880, 1890) switch from one coupling element to another coupling element, or from one split pole to another split pole, varies between each split array. If, as in the embodiment shown in FIG. 21, there are four split arrays, and those split arrays are offset in the direction of motion so as to prevent complete alignment of the poles and coupling elements (rotationally offset in this embodiment), then for a small movement (that would otherwise have caused a transition in the whole field if complete alignment was allowed) there will now be only one fraction of the flux shown switching (one quarter in this embodiment). However, in this embodiment there will be four times as many such transitions for a particular movement distance of the assembly (e.g. a full rotation). The torque transfer for that movement is thus in total the same, but is delivered more continuously leading to lower "cogging". For clarity, only a single coupling member is shown in FIG. 17b. As shown in FIG. 21, this coupling member can also be split into coupling parts (2130) to (2133). Splitting the coupling member in this way reduces the interaction between the split arrays of the members, but is not necessary for a reduction in "cogging" to be achieved.

Referring now to FIG. 22, which has first and second members (1773 and 1783) (with the second member having poles (1745, 1754)), an epicyclic embodiment of the invention is shown, this time having a first member with a first array of magnetic poles (in pairs) arranged on it in the direction of motion. A coupling element (2130) is arranged concentrically between the first (rotatable) member and a second (rotatable) member. The coupling element is also split, into multiple coupling parts (again, three coupling parts in this embodiment). A single coupling element is shown for clarity but a plurality of coupling elements is employed, forming a barrel concentrically around the first member. The second member is arranged concentrically outside the first member and the coupling elements. The second member has on its inner circumference a second array of magnetic poles, in north-south pairs, arranged in the direction of motion. The second array of poles is split into multiple split arrays (three split arrays in this embodiment), arranged side by side along the axis of rotation (which is orthogonal to the direction of motion). In use, the first and second members contra-rotate. If one member is rotated, magnetic flux couples between the poles of the first array and the poles of the second array, through the coupling element, and the other member is caused to contra-rotate and vice-versa.

It will also be appreciated from FIGS. 21 and 22 that, instead of, or in addition to the splitting of first and/or second pole arrays (into split arrays) along their axial length (the axis is orthogonal to the direction of relative motion), and the offsetting in the direction of motion of each split array, each coupling element can optionally, alternatively or also, be split into coupling parts along its axial length (2130, 2131, 2132) as shown, and these coupling parts can accordingly also be offset. One, or a combination of these features can be incorporated so as to diversify the positions at which magnetic flux switches from one path to another path as shown in FIG. 19c. This strategy may be referred to as staggering the poles, or staggering the coupling elements. Staggering the poles and/or coupling elements results in a reduction of the variation of torque coupling capability when plotted against position. This is shown in FIG. 26 as the curve which exhibits a relatively small variation of torque coupling capability, (around 25 to 35 Nm). This represents an improvement in performance over conventional magnetic gear couplings, for the following reasons.

The minimum torque coupling capability of the improved magnetic gear is greater and does not fall below 25 Nm, shown in FIG. 26. (In contrast, the prior art magnetic gear torque coupling capability falls at some angular meshing positions to a figure of less than 20 Nm). Accordingly, for a given design torque capability, the size of the magnets used in the improved magnetic gear can accordingly be reduced in size while still delivering the torque coupling capability. The reduction in variation of torque coupling capability thereby allows such an improved magnetic gear to be designed with smaller, lighter and cheaper magnets.

A further advantage of the improved magnetic gear described herein is that since the torque coupling capability has less variation, in use, when a torque is applied to the improved magnetic gear coupling, the resultant angular offset or "slippage" (being proportional to the torque applied and the torque coupling capability), is more constant than that which would result in a prior art magnetic gear coupling. Thereby, torsional vibrations caused by this variation are reduced. The reduced torsional vibrations are less likely to cause severe resonance which might damage components, require component strength to be uprated with associated cost implications, or cause the coupling to slip out of mesh and lose alignment.

A further embodiment is shown in FIG. 23 which has poles (1714, 1724, 1746, 1756), whereby the coupling element (2330) follows a sinusoidal path along an axis orthogonal to the direction of movement of the first and second members (in this embodiment, along the axis of rotation of first and second members) such that its position in the direction of motion of the first and second members varies along the axis. The shape of the coupling element is symmetrical between its ends, along the axis so as to balance the axial forces resulting and thereby cancel them. Thereby, the position at which magnetic lines of flux switch position, as shown in FIG. 19c, varies with axial position. Again, only a single coupling element (2330) is shown in figure for clarity. However, multiple coupling elements will normally be employed as described earlier.

Furthermore, although FIGS. 18a to 23 generally show rotating embodiments, with the first and second members either alongside each other or concentric with each other, as shown in FIG. 24, an end-on alignment of first and second members (1774 and 1784) is also possible. In such an end-on embodiment, the coupling element (2430) can either be curved, or can be split into parts (2431) to (2436) which are staggered, and the coupling element and/or the poles of the first and second members can also be split, this time rather than being split along the axis of rotation, they are split in a radial direction.

Furthermore referring to FIGS. 22 and 23, one or both of the first and second members could be unrolled so as to form a planar surface. Such an embodiment would resemble a rack and pinion, or a pair of tracks slidable over each other, with the coupling element being disposed therebetween. In such embodiments, the first and/or second members and/or the coupling elements would be staggered in a direction which is orthogonal to the direction of movement and parallel to a surface between the members.

FIG. 25 shows a cross-sectional view of a practical embodiment which has first and second members (1775 and 1785) and wherein a drive-shaft (1570) is coupled to the second member (1785) which has magnetic poles (1748) arranged in an array around its circumference. The poles (1748) of the second member (1785) are split in a direction parallel to the axis of rotation (orthogonal to the direction of rotation) into multiple split parts (eight in this embodiment). This results in multiple split arrays of split poles arranged on the second member. In this embodiment there are eight split arrays, each arranged circumferentially around the second member, and each split array side by side along the axis of rotation. Each split array is positionally offset with respect to another. In this embodiment, each split array is rotated with respect to the other slightly so as to span a spread of angles at least equal to the distance between north-south pairs of poles of the member. Backing iron pieces (2580) are arranged concentrically between the second member (1767) and the magnetic split poles (1748).

Concentrically outside the second member and its pole arrays is a wall of a vacuum chamber (1554) which also extends around the axial ends of the device, thereby forming a toroidal shape, and incorporates in its inner circumferential wall coupling elements (2130, 2131). This allows very efficient packaging of the flywheel, ease of manufacture and sealing. The coupling elements are located concentrically between the first and second members and are arranged in an array forming a barrel concentrically around the second member and inside the first member. Each of the coupling elements are also split along their axial length to form multiple coupling parts per coupling element (eight coupling parts per coupling element in this embodiment). Thus, the barrel formed by the coupling elements is split into rings and each ring is preferably offset (rotationally offset in this embodiment) from another of the rings. Alternatively, the coupling elements, instead of being split, can be shaped so as to still lie within the barrel of the inner vacuum chamber wall, but to vary their position in the direction of motion as the length of the barrel is traversed, for example in a chevron or sinewave pattern.

Concentrically further outside, the poles (2110, 2111) of the first member (1775) are supported inside a composite flywheel rim (50) with backing iron pieces (2590) interposed between the rim and the poles. Again, each of the poles (2110, 2111) of the first member are split along the axial length of the device into multiple split poles per pole (eight in this embodiment). The split poles are arranged around the internal surface of the rim (50) to form split arrays (eight in this embodiment). The first and second members (1775, 1785) are supported on bearings (2010) such that they are able to rotate. The first member (1766) is thereby able to rotate inside the vacuum chamber (1554), and a second member is able to rotate concentrically inside the vacuum chamber but outside of the vacuum (e.g. in air), and separated from the first member by the vacuum chamber (1554) wall.

In use the vacuum chamber preferably contains a hard vacuum. Although not shown, the first and second members have different numbers of north/south pole pairs arranged radially around them, such that a gear ratio results between them. In use, this allows the second member (1785) (which operates in air) to rotate at a relatively lower speed than the first member (1775) which is operated in the vacuum. Thereby, losses associated with air resistance (or windage) when the second member rotates are reduced. Also, the use of supersonic speeds for the first member and flywheel components is enabled by use of a vacuum to house the flywheel, since supersonic shock and frictional overheating are avoided.

The vacuum chamber (1554) has no rotating seals and is therefore able to be completely sealed without leakage (which is unavoidable when rotating seals are used, and is worse at higher rotational speeds), thereby obviating the need for equipment associated with maintaining the vacuum, such as a vacuum pump, control electronics, pipe work etc. Removal of rotating seals also allows higher rotational flywheel speeds, and lower losses due to elimination of drag. Thereby the energy storage density of the flywheel is increased and the associated cost of such a flywheel is reduced. Reliability is also improved due to the increased simplicity of this arrangement, and due to the elimination of rotating seals which wear in use (and wear especially rapidly at high rotational speeds).

Furthermore, the "anti-cogging" features incorporated in this embodiment, as previously described, allow the use of smaller permanent magnets (due to the minimum torque coupling capability being closer to the mean torque coupling capability) with associated advantages of lower cost and weight, thereby increasing the energy storage density of the flywheel. Smaller magnets also enable a higher gearing ratio to be produced since a greater number of north/south pole pairs can be packed into a flywheel of a given size. This higher gearing ratio further reduces losses associated with air resistance or windage, on the air side of the device, further increasing efficiency of the flywheel and its energy storage density. A further advantage of the anti-cogging features previously described is an improvement in noise vibration and harshness, and extended service life of components due to the reduction in torsional vibration brought about by these features. This will also allow components to be re-specified so as to use cheaper material, or less material, thereby bringing about cost and/or weight advantages. Manufacturing efficiencies may also be gained from the ability to use materials which would not have withstood torsional vibrations, but which are easier to machine or process during manufacturing.

It will be seen that as a result of the features described above, a stronger safer, lighter, more efficient and more effective flywheel can be provided for energy storage.

The invention claimed is:

1. Apparatus for coupling force between first and second movable members, wherein the first movable member has a first array of alternating magnetic poles arranged thereon and the second movable member has a second array of alternating magnetic poles arranged thereon, wherein:

magnetic flux coupling means is arranged between the first and second movable members, wherein there is a first spacing between the magnetic flux coupling means and the first movable member and a second spacing between the magnetic flux coupling means and the second movable member, wherein the magnetic flux coupling means comprises one or more coupling elements; and a vacuum chamber contains one of the first and second movable members, the vacuum chamber having a vacuum chamber wall, wherein the magnetic flux coupling means is incorporated in the vacuum chamber wall which separates the first and second movable members, wherein the vacuum chamber is arranged to enclose a vacuum around a flywheel and wherein each coupling element is segmented orthogonally to a direction of relative motion between the members.

2. The apparatus of claim 1 in which one of the first and second members is coupled to the flywheel.

3. The apparatus of claim 1 in which in operation the first member has a first velocity and second member has a second velocity, wherein the first velocity of the first member is equal to the second velocity of the second member multiplied by a multiplier, the multiplier being proportional to the ratio of the number of magnetic pole pairs of the first and second members.

4. The apparatus of claim 1 in which the first and second members are rotatable, and the first and second spacings are angular spacings.

5. The apparatus of claim 4 in which the first array is arranged inside the second array.

6. The apparatus of claim 4 in which the first array is arranged opposite the second array.

7. The apparatus of claim 4 in which the first array is arranged alongside the second array.

8. The apparatus of claim 1 wherein the one or more coupling elements include material having a relative permeability greater than about 400.

9. The apparatus of claim 1 wherein each coupling element has substantially the same thickness as the vacuum chamber wall.

10. The apparatus of claim 1 wherein the first and second movable members are relatively rotatable about an axis of rotation and each coupling element havs a width that increases with radius from the axis of rotation.

11. The apparatus of claim 1 wherein the number of coupling elements is sufficient to span two pole- pairs of the member having the greatest pole spacing.

12. The apparatus of claim 1 in which the poles of each array are substantially equally spaced with respect to other poles of the same array in a direction of motion between the members.

13. The apparatus of claim 1 in which the poles of the first and second members are arranged with a spacing therebetween in a direction of relative motion between the members, wherein the coupling means provides a region of relatively high magnetic flux density between a pole of the first member and a pole of the second member, further in which at least one of the first array, the second array, and the coupling means are arranged such that the alignment of the region relative to at least one of the first member, the second member and the coupling means, varies along a line between the members and orthogonal to the direction of motion.

14. Apparatus for coupling force between first and second movable members, wherein the first movable member has a first array of magnetic poles arranged thereon and the second movable member has a second array of magnetic poles arranged thereon, wherein:

magnetic flux coupling means is arranged between the first and second movable members, wherein there is a first spacing between the magnetic flux coupling means and the first movable member and a second spacing between the magnetic flux coupling means and the second movable member; and a chamber containing one of the first and second movable members, the chamber having a chamber wall, wherein the magnetic flux coupling means is incorporated in the chamber wall which separates the first and second movable members, wherein the magnetic flux coupling means comprises one or more coupling elements and each coupling element varies in alignment with the poles of the first and second members in the direction of motion, along a line orthogonal to the direction of motion.

15. Apparatus for coupling force, the apparatus comprising a first rotatable member comprising a first array of magnetic poles and a second rotatable member comprising a second array of magnetic poles, wherein the first and second rotatable members are arranged to contra rotate;

a chamber containing one of the first and second rotatable members and having a chamber wall which separates the first and second rotatable members; and a magnetic flux coupling arranged between the first and second rotatable members, wherein the magnetic flux coupling comprises a plurality of magnetic flux coupling elements incorporated in the chamber wall.

16. The apparatus of claim 15, wherein each of the plurality of magnetic flux coupling element varies in alignment with the poles of the first and second members in the direction of motion, along a line orthogonal to the direction of motion.

* * * * *